(12) United States Patent
Nakagawa et al.

(10) Patent No.: US 11,048,543 B2
(45) Date of Patent: Jun. 29, 2021

(54) COMPUTER SYSTEM AND RESOURCE ACCESS CONTROL METHOD FOR SECURELY CONTROLLING ACCESS USING ROLES WITH A PLURALITY OF USERS

(71) Applicant: HITACHI, LTD., Tokyo (JP)

(72) Inventors: Hirotaka Nakagawa, Tokyo (JP); Kazuei Hironaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 84 days.

(21) Appl. No.: 16/359,465

(22) Filed: Mar. 20, 2019

(65) Prior Publication Data

US 2019/0361726 A1 Nov. 28, 2019

(30) Foreign Application Priority Data

May 24, 2018 (JP) .............................. JP2018-099758

(51) Int. Cl.
*G06F 9/46* (2006.01)
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2005/0132220 A1* | 6/2005 | Chang | H04L 63/101 726/4 |
| 2008/0243854 A1 | 10/2008 | Noguchi | |
| 2012/0102201 A1 | 4/2012 | Nakagawa et al. | |
| 2015/0063354 A1* | 3/2015 | Sonoda | H04L 45/42 370/392 |

FOREIGN PATENT DOCUMENTS

| | | |
|---|---|---|
| JP | 2008-242826 A | 10/2008 |
| JP | 2013-535721 A | 9/2013 |

OTHER PUBLICATIONS

Japanese Office Action dated Mar. 31, 2020 for the Japanese Patent Application No. 2018-099758.

* cited by examiner

*Primary Examiner* — Gregory A Kessler
(74) *Attorney, Agent, or Firm* — Volpe Koenig

(57) ABSTRACT

A computer system having a plurality of resources used for a source program includes: resource management information for storing information in which each of the resources is associated with a resource group; and resource group management information for storing information in which a user capable of using the resource group is associated with the source program. When receiving a request designating the resource related to a user who uses the source program from the source program, a control unit uses the resource group management information and the resource management information to determine whether access to the resource related to the request is permitted.

9 Claims, 21 Drawing Sheets

FIG. 5

| USER ID | PASSWORD | USER GROUP ID | ROLE |
|---|---|---|---|
| UID001 | **** | UG1 | APPLICATION_MODIFY |
| | | | VM_ADMIN_VIEW |
| | | | STORAGE_ADMIN_VIEW |
| UID002 | **** | UG2 | VM_ADMIN_MODIFY |
| | | | STORAGE_ADMIN_VIEW |
| | | | STOARGE_ADMIN_PROVISIONING |
| UID003 | **** | UG3 | STORAGE_ADMIN_MODIFY |
| UID004 | **** | UG4 | STORAGE_ADMIN_MODIFY |
| | | | STORAGE_MAINTENANCE |
| UID005 | **** | UG5 | APPLICATION_MODIFY |
| | | | VM_ADMIN_MODIFY |
| | | | STORAGE_ADMIN_MODIFY |

| LU ID | CAPACITY | POOL ID | RESOURCE GROUP ID | PORT ID |
|---|---|---|---|---|
| 0001 | 3TB | POOL1 | RSG2 | 1-A |
| 0002 | 2TB | POOL1 | RSG3 | 2-A |

FIG. 7

| PORT ID | WWN | INITIATOR WWN | RESOURCE GROUP ID |
|---|---|---|---|
| 1-A | wwn1 | wwn10 | RSG2 |
| 1-B | wwn2 | - | RSG0 |
| 2-A | wwn3 | wwn20 | RSG3 |
| 2-B | wwn4 | - | RSG0 |
| ⋮ | ⋮ | ⋮ | ⋮ |
| F-B | wwn256 | - | RSG0 |

FIG. 8

| POOL ID | CAPACITY | FREE CAPACITY | PARITY GROUP ID | RESOURCE GROUP ID |
|---|---|---|---|---|
| POOL1 | 100TB | 95TB | PG001 PG002 | RSG1 |

FIG. 9

| PARITY GROUP ID | RAID INFORMATION | DISK INFORMATION | CAPACITY |
|---|---|---|---|
| PG001 | RAID5 (4D+1P) | DISK0000 DISK0001 DISK0002 DISK0003 DISK0004 | 50TB |
| PG002 | RAID5 (4D+1P) | DISK0010 DISK0011 DISK0012 DISK0013 DISK0014 | 50TB |

| SOURCE PROGRAM IP ADDRESS | TYPE | ROLE |
|---|---|---|
| 192.168.20.202:2017 | PROVIDER1 | VM_ADMIN_MODIFY STORAGE_ADMIN_MODIFY |
| 192.168.20.202:1111 | PROVIDER2 | APPLICATION_MODIFY STORAGE_ADMIN_MODIFY |
| 192.168.20.202:0089 | STORAGE CONSOLE | STORAGE_ADMIN_MODIFY |
| 10.10.101.11:2020 | DBMS CONSOLE | APPLICATION_MODIFY STORAGE_ADMIN_VIEW |
| 10.1.3.40:3450 | VM CONSOLE | VM_ADMIN_MODIFY STORAGE_ADMIN_VIEW |

| RESOURCE GROUP ID (T7010) | USER GROUP ID (T7020) | ROLE (T7030) | SOURCE PROGRAM IP ADDRESS (T7040) |
|---|---|---|---|
| RSG0 | - | STORAGE_ADMIN_MODIFY | 192.168.20.202:0089 |
| RSG0 | - | STORAGE_MAINTENANCE | |
| RSG1 | UG2 | VM_ADMIN_MODIFY | 192.168.20.202:2017 |
| RSG1 | UG3 | STORAGE_ADMIN_MODIRY | 192.168.20.202:1111 |
| RSG1 | UG4 | STORAGE_MAINTENANCE | |
| RSG2 | UG2 | VM_ADMIN_MODIFY | 10.1.3.40:3450 |
| RSG2 | UG4 | STORAGE_ADMIN_MODIRY | |
| RSG2 | UG4 | STORAGE_MAINTENANCE | |
| RSG2 | UG1 | APPLICATION_MODIFY | 10.10.101.11:2020 |
| RSG2 | UG4 | STORAGE_MAINTENANCE | |

| PORT ID | WWN | INITIATOR WWN | RESOURCE GROUP ID | NODE ID |
|---|---|---|---|---|
| 1-A | wwn1 | wwn10 | RSG2 | 001 |
| 1-B | wwn2 | - | RSG0 | 001 |
| 2-A | wwn3 | wwn20 | RSG3 | 002 |
| 2-B | wwn4 | - | RSG0 | 002 |
| ⋮ | ⋮ | ⋮ | ⋮ | ⋮ |
| F-B | wwn256 | - | RSG0 | 003 |

FIG. 22

| POOL ID | CAPACITY | PARITY GROUP ID | RESOURCE GROUP ID | NODE ID |
|---|---|---|---|---|
| POOL1 | 100TB | PG001 PG002 | RSG1 | 001 |
| POOL2 | 100TB | PG003 | RSG1 | 003 |

//* # COMPUTER SYSTEM AND RESOURCE ACCESS CONTROL METHOD FOR SECURELY CONTROLLING ACCESS USING ROLES WITH A PLURALITY OF USERS

CLAIM OF PRIORITY

The present application claims priority from Japanese patent application JP 2018-99758 filed on May 24, 2018, the content of which is hereby incorporated by reference into this application.

BACKGROUND OF THE INVENTION

1. Field of the Invention

The present invention relates to access control in a system that provides resources.

2. Description of the Related Art

With the progress of virtualization technology, a system has been adopted, the system having a configuration in which a plurality of virtual servers (virtual machines (VMs)) is constructed on one physical computer, and an image of the VM and data used by an application operating on the VM are stored in a logical volume generated in a storage device. To this system, a management system is applied in which volume provisioning such as creation of a logical volume, capacity expansion and reduction of a logical volume, deletion of a logical volume, or the like is entrusted to a VM administrator.

In the present specification, management software for managing the VM and the application is described as higher management software, and an administrator who uses the higher management software is described as higher administrator.

In the system described above, the upper management software provides the higher administrator with the logical volume as a similar storage region to a local disk on the physical computer. When receiving an operation request for the logical volume of the storage device, the upper management software executes operation processing of the logical volume via a storage resource operation application programming interface (API). Note that the storage resource operation API is provided by a provider that is software provided by a storage vendor.

When the system having the management system as described above is used, the upper administrator can perform management consistently from the VM and the application to the storage resource, and can have a benefit of reduction of operating expense (OPEX) on the whole system.

Meanwhile, user authentication using federation method single sign-on that uses standardized protocols such as the Security Assertion Markup Language (SAML) and sharing of a role (operation authority) have been applied to the above system due to the trend of the cloud.

Note that the single sign-on is a technology that enables use of multiple cloud services and web applications by one login to an authentication server such as LDAP and RADIUS.

In a software-defined infrastructure (SDI), upper administrator can collectively manage computers, VMs and applications, and storage resources using upper management software. The upper administrator accesses the upper management software using single sign-on. Roles such as resource access control information and operation authority information used for single sign-on are set for resources managed by the higher management software, and are effective only within each piece of management software.

When the upper management software stops, the higher administrator uses dedicated management software of the storage device to perform the above-mentioned management. For this reason, the higher administrator is allowed to access the dedicated management software. The upper administrator accesses the dedicated management software using single sign-on as similar to the upper management software.

With conventional dedicated management software, access control using roles is not performed. Therefore, when using the dedicated management software, the higher administrator can access storage resources other than storage resources used by the upper management software. Therefore, when systems operated by different upper administrators share one storage device, there is a fear that an erroneous operation on storage resources may be performed, and information leakage and system shutdown may occur.

As a method for managing storage resources provided by a storage device, a technology disclosed in JP 2013-535721 A is known. JP 2013-535721 A discloses that "in a storage device managed by a plurality of management users and a method for controlling the storage device, exclusive control processing is performed in which resources to be managed are divided into a plurality of resource groups, and a resource group is set as a range of exclusive control of management operation by a management user".

SUMMARY OF THE INVENTION

In a virtualization technology, different resources are generated for each user, and different operation authorities are set for the operation of each resource. In some cases, another resource is used to generate an arbitrary resource.

In the technology disclosed in JP 2013-535721 A, access control is performed on the basis of authority information related to a resource group assigned to a user. Therefore, access control cannot be performed for a resource group to which a resource managed by another user belongs.

For example, consider a case where a resource generated from a resource shared by a plurality of users (shared resource) is operated. In this case, even if the technology disclosed in JP 2013-535721 A is applied as it is, access control cannot be performed for the resource group to which the shared resource belongs. In order to control access to a resource group to which a shared resource belongs, it is necessary to set a role for the shared resource. However, in the system using the virtualization technology, since the relationship of the resources is complicated, it is difficult to set the role for the shared resource.

The present invention provides a system and method for realizing access control to various resources using the virtualization technology.

A representative example of the invention disclosed in the present application is as follows. That is, a computer system having a plurality of resources used for a source program includes: resource management information for storing information in which each of the resources is associated with a resource group; and resource group management information for storing information in which a user capable of using the resource group is associated with the source program. When receiving a request designating the resource related to a user who uses the source program from the source program, a control unit uses the resource group management information and the resource management information to determine whether access to the resource related to the request is permitted.

According to one embodiment of the present invention, operation for resources can be controlled in units of users (user groups) while securing security. The problems, configurations, and effects other than those described above will be clarified from the description of the embodiments below.

BRIEF DESCRIPTION OF THE DRAWINGS

FIG. 5 is a diagram illustrating an example of a data structure of account management information held by an authentication server according to the first embodiment;

FIG. 6 is a diagram illustrating an example of a data structure of LU management information stored in a control memory according to the first embodiment;

FIG. 7 is a diagram illustrating an example of a data structure of port management information stored in the control memory according to the first embodiment;

FIG. 8 is a diagram illustrating an example of a data structure of pool management information stored in the control memory according to the first embodiment;

FIG. 9 is a diagram illustrating an example of a data structure of parity group management information stored in the control memory according to the first embodiment;

FIG. 10 is a diagram illustrating an example of a data structure of source program management information stored in the control memory according to the first embodiment;

FIG. 11 is a diagram illustrating an example of a data structure of resource group management information stored in the control memory according to the first embodiment;

FIG. 21 is a diagram illustrating an example of a data structure of port management information held by the master storage device according to the second embodiment;

FIG. 22 is a diagram illustrating an example of a data structure of pool management information held by the master storage device according to the second embodiment;

DESCRIPTION OF THE PREFERRED EMBODIMENTS

Embodiments will be described below with reference to the drawings.

In the description below, although information of each embodiment will be described with the expression "table", these pieces of information may not be tables, and may be represented by a data structure other than the table. Although there are cases where description is made with "program" as the subject, since the program is executed by the processor to execute determined processing while using a memory and a communication port, the description is the same as the description with the processor as the subject.

Also, the processing performed by execution of the program by the processor is the same as the processing by dedicated hardware, and part or all of the processing may be realized by dedicated hardware. For this reason, although an object is described by the expression "unit", part or all of these "parts" may be execution of a program by a processor, or part or all of these "parts" may be dedicated hardware.

The program may be installed by a program distribution server or a storage medium readable by a computer.

First Embodiment

In a first embodiment, resource access control processing by a configuration control program operating on a storage device will be described.

Figure 1:
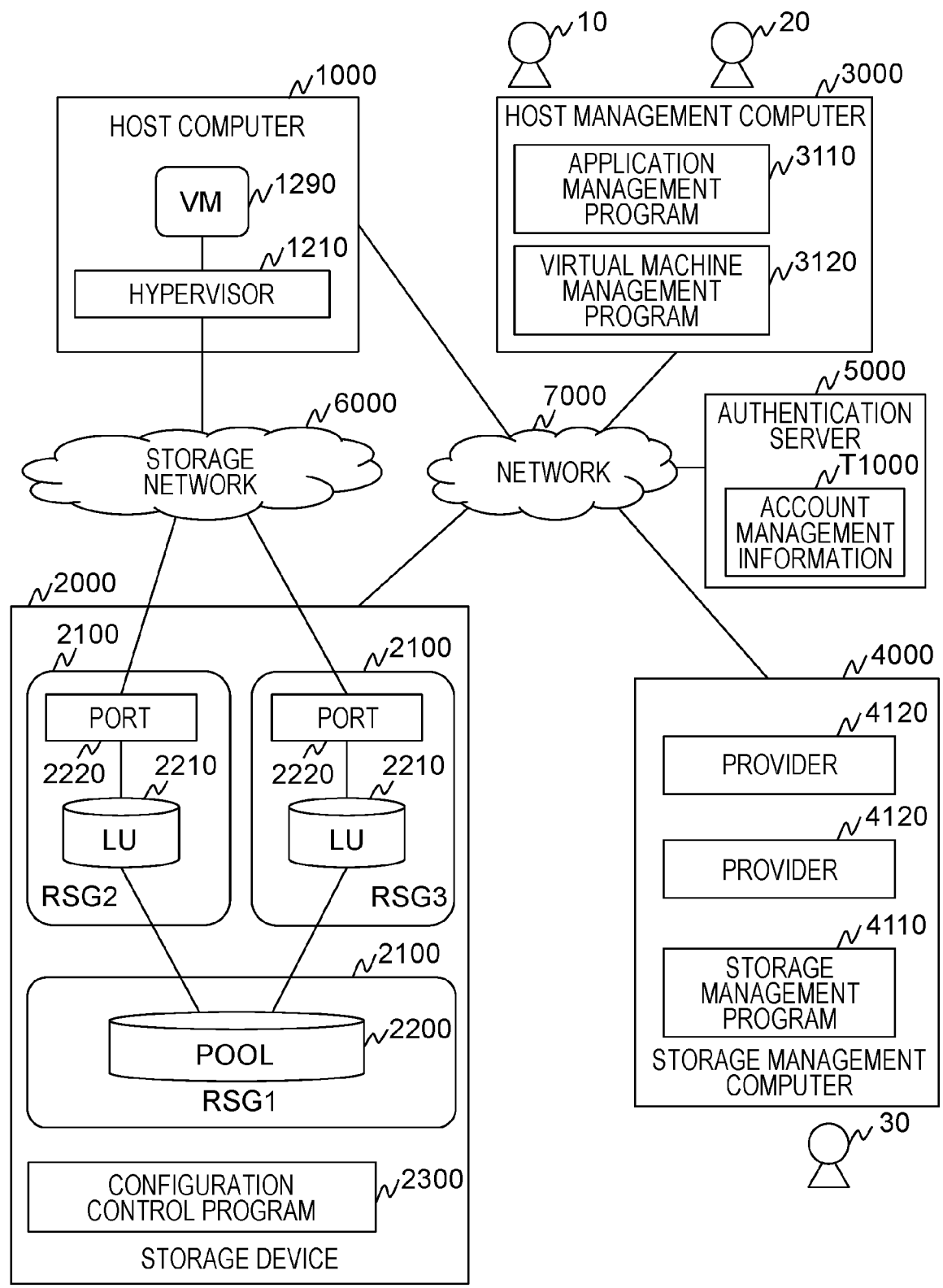
FIG. 1 is a diagram illustrating an example of a configuration of a system according to a first embodiment.

FIG. 1 is a diagram illustrating an example of a configuration of a system according to the first embodiment.

The system includes a host computer 1000, a storage device 2000, a host management computer 3000, a storage management computer 4000, and an authentication server 5000.

The host computer 1000 and the storage device 2000 are connected via a storage network 6000 including a storage area network (SAN), an iSCSI, or the like. The host computer 1000, the storage device 2000, the host management computer 3000, the storage management computer 4000, and the authentication server 5000 are connected via a network 7000 configured by a local area network (LAN) or the like.

The host computer 1000 provides computer resources such as a personal computer, a workstation, or a mainframe to configure a business system. A hypervisor 1210 that manages a VM 1290 is operated on the host computer 1000. A logical unit (LU) 2210 provided by the storage device 2000 is assigned to the host computer 1000. The hypervisor 1210 manages an LU 2210 as a data store (not illustrated). The LU 2210 is used as a storage region for image data of the VM 1290 and data of OS or application operating on the VM 1290.

The host management computer 3000 is a computer for managing the host computer 1000. The VM administrator 10 and the application administrator 20 use an operation terminal (not illustrated) to access the system, and use a virtual machine management program 3120 and an application management program 3110 of the host management computer 3000 to manage the host computer 1000, the VM 1290, and the OS and application operating on the VM 1290.

The storage device 2000 provides storage resources for configuring a business system. The storage device 2000 has a configuration control program 2300. The configuration control program 2300 controls resources in the storage device 2000. The storage device 2000 manages resources such as the pool 2200 and the LU 2210 in units of resource groups (RSGs) 2100.

The storage device 2000 holds LU management information T2000, port management information T3000, pool management information T4000, parity group management information T5000, source program management information T6000, and resource group management information T7000.

Details of the LU management information T2000 will be described with reference to FIG. 6. Details of the port management information T3000 will be described with reference to FIG. 7. Details of the pool management information T4000 will be described with reference to FIG. 8. Details of the parity group management information T5000 will be described with reference to FIG. 9. Details of the source program management information T6000 will be described with reference to FIG. 10. Details of the resource group management information T7000 will be described with reference to FIG. 11.

The storage management computer 4000 is a computer for managing the storage device 2000. The storage management computer 4000 has a storage management program 4110 and a provider 4120.

The storage management program 4110 provides a graphical user interface (GUI) and a command line interface (CLI) for operating storage resources. The storage administrator 30 accesses the system using an operation terminal and uses the storage management program 4110 to instruct the configuration control program 2300 to operate the storage resources and perform the device maintenance operation.

The provider 4120 provides an API for executing operation of storage resources conforming to the format and schema defined by the application management program 3110 and the virtual machine management program 3120. The application management program 3110 and the virtual machine management program 3120 or the hypervisor 1210 transmits the operation request of the storage resources via the API provided by the provider 4120. When receiving the operation request of the storage resources, the provider 4120 transmits the operation request to the configuration control program 2300. The configuration control program 2300 executes processing corresponding to the operation request.

In this specification, unless the application management program 3110, the virtual machine management program 3120, and the storage management program 4110 are not distinguished from each other, they are described as source programs. When the VM administrator 10, the application administrator 20, and the storage administrator 30 are not distinguished from each other, they are described as management users.

An authentication server 5000 performs authentication processing using the Light Weight Directory Access Protocol (LDAP), the Remote Authentication Dial In User Service (RADIUS), or the like. More specifically, the authentication server 5000 executes user authentication processing and authorization processing in login processing for software operating on the host computer 1000, the host management computer 3000, and the storage management computer 4000.

The authentication server 5000 holds account management information T1000 for managing passwords, roles, or the like.

Here, an example of the user authentication processing and the authorization processing will be described. When accepting access from the management user, the source program transmits a request for user authentication processing and authorization processing to the authentication server 5000. The authentication server 5000 executes user authentication processing and authorization processing. When the processing is completed normally, the authentication server 5000 issues a ticket indicating the authentication certificate and transmits the ticket to the source program. Methods of the ticket include a method of including the authorization information and attribute information of the user and a method of including a value such as a character string used for inquiring to the authentication server 5000. Here, the attribute information of the user is, for example, the ID of the user, the ID of the group to which the user belongs, or the like.

In the present specification, for the sake of simplicity of description, description will be given on the premise that the authorization information and the attribute information of the user are included in the ticket. However, similar processing and effect can be achieved by a method of including a value such as a character string used for inquiring to the authentication server 5000.

When the source program accepts a call request of another source program from the management user, the received ticket is transmitted to another source program so that proxy authentication is performed, and the login processing is completed. As a result, single sign-on is established.

It is assumed that the authentication server 5000 and the source program of the first embodiment conform to standards such as the Security Assertion Markup Language (SAML). As a result, user groups, roles, or the like can be given to the ticket. Therefore, user groups and roles can be shared between source programs.

Next, configurations of the host computer 1000, the storage device 2000, the host management computer 3000, and the storage management computer 4000 will be described.

Figure 2:
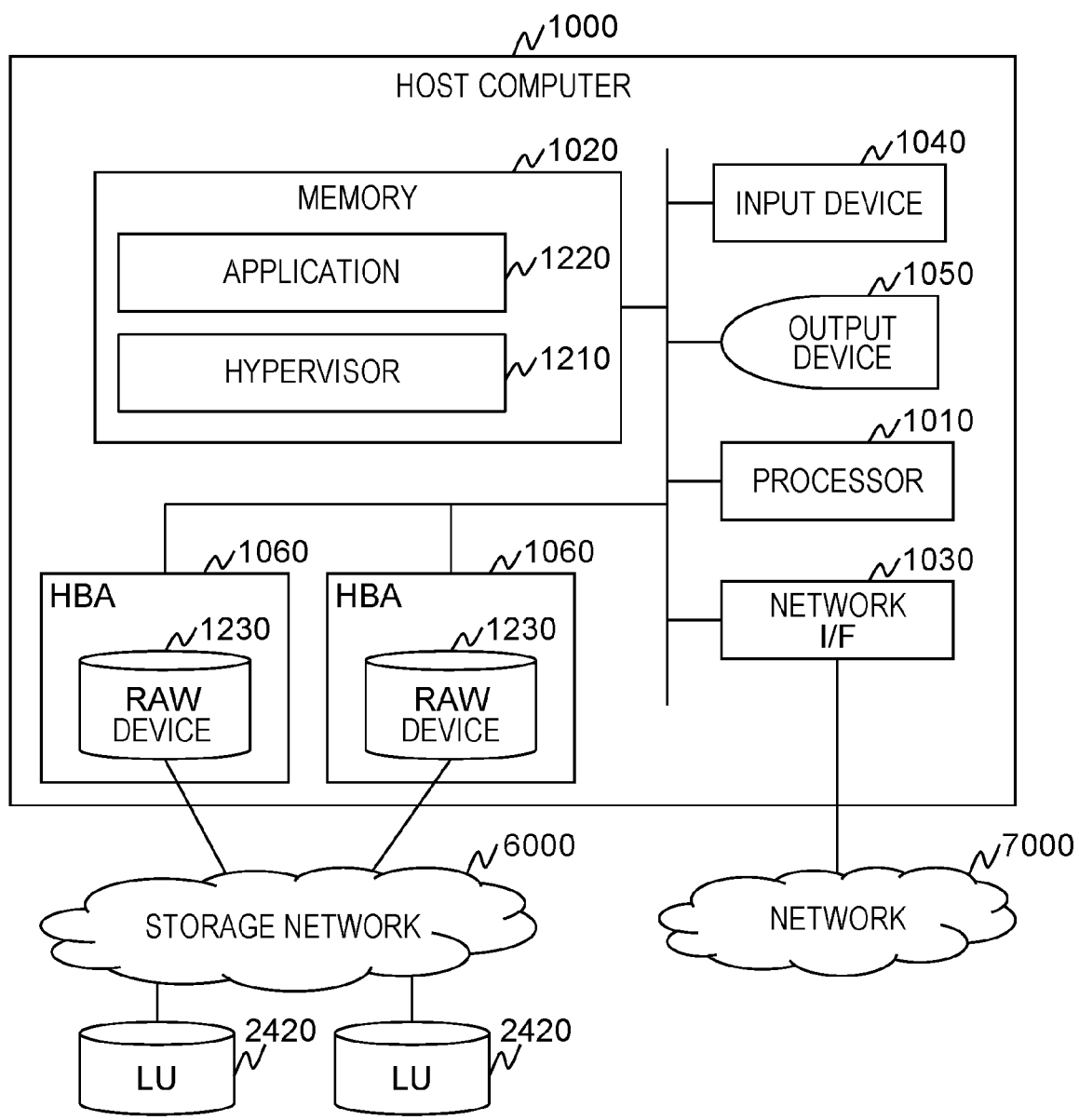
FIG. 2 is a diagram illustrating an example of a configuration of a host computer according to the first embodiment.

FIG. 2 is a diagram illustrating an example of a configuration of the host computer 1000 according to the first embodiment.

The host computer 1000 includes, as hardware, a processor 1010, a memory 1020, a network I/F 1030, an input device 1040, an output device 1050, and a host bus adapter (HBA) 1060. The pieces of hardware are connected to each other via an internal bus.

The processor 1010 executes a program stored in the memory 1020. The processor 1010 executes processing according to a program to operate as a functional unit (module) that realizes a specific function. For example, the processor 1010 executing the hypervisor 1210 transmits an access request to the storage device 2000. In the following description, when processing is described with the program as the subject, such description indicates that the processor 1010 executes a program.

The memory 1020 stores programs executed by the processor 1010 and information used by the program. The memory 1020 includes a work area used by the program. The memory 1020 of the first embodiment stores programs for realizing the hypervisor 1210 and the application 1220. The memory 1020 stores data which is the entity of the VM 1290.

The hypervisor 1210 has a function of managing the VM 1290 and a function of generating a virtual disk from the RAW device 1230.

The network I/F 1030 is an interface for connecting with another apparatus via the network 7000.

The input device 1040 is a keyboard, a mouse, a switch, a pointing device, a microphone, or the like. The output device 1050 is a display, a speaker, a printer, or the like.

The HBA 1060 is an interface for connecting with the storage device 2000 via a storage network 6000. The HBA 1060 executes data and command transmission processing and reception processing according to a predetermined protocol such as the Fiber Channel Protocol.

Figure 3:
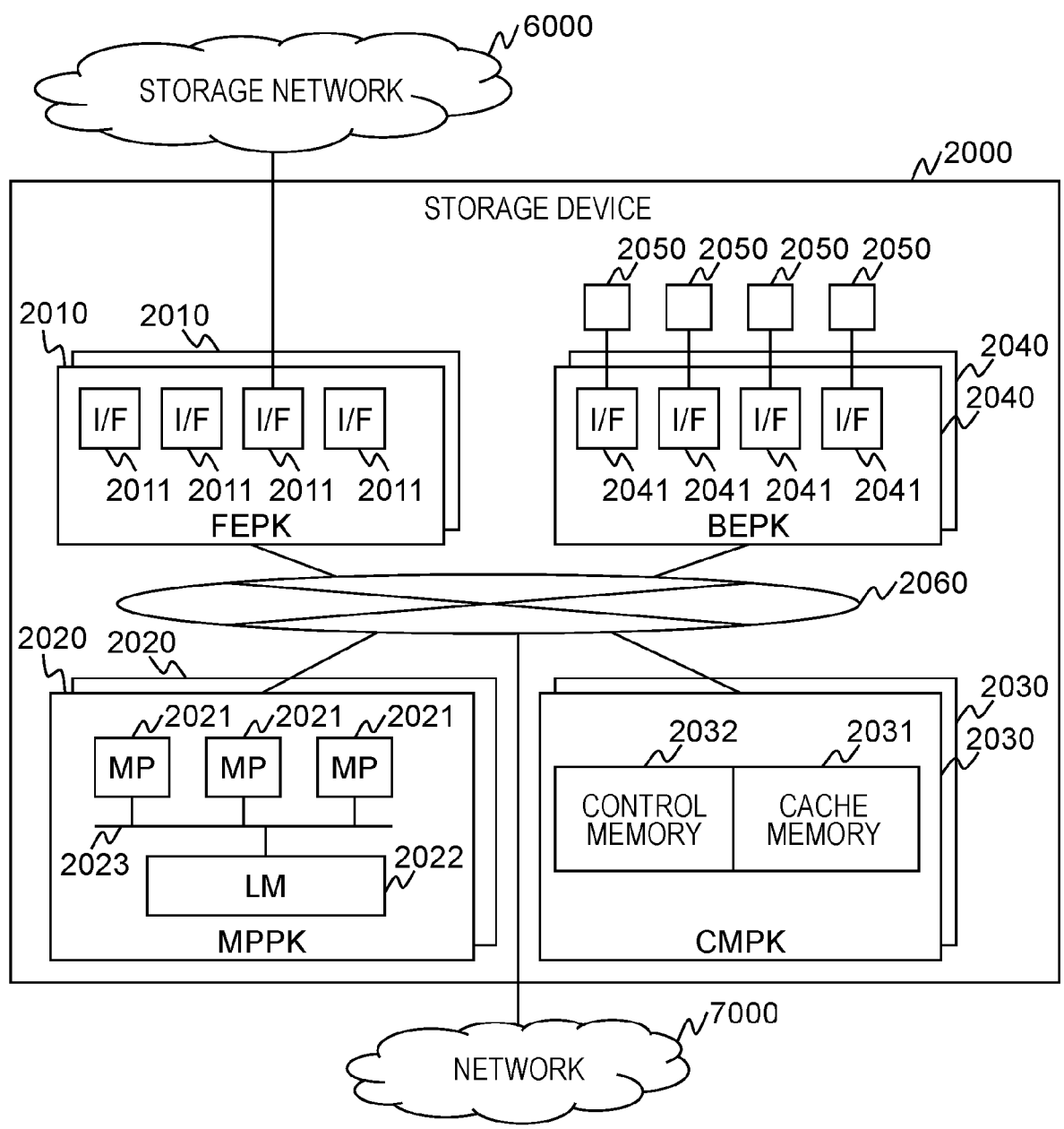
FIG. 3 is a diagram for explaining an example of a configuration of a storage device according to the first embodiment.

FIG. 3 is a diagram for explaining an example of a configuration of the storage device 2000 according to the first embodiment.

The storage device 2000 includes, as hardware, a frontend package (FEPK) 2010, a micro processor package (MPPK) 2020, a cache memory package (CMPK) 2030, and a backend package (BEPK) 2040. The pieces of hardware are connected to each other via an internal network 2060. The pieces of hardware are connected with the network 7000 via the internal network 2060.

The FEPK 2010 has a plurality of host I/Fs 2011. The host I/F 2011 functions as an interface for communicating with the storage device 2000. The host I/F 2011 has one or more ports (not illustrated). Each port is assigned a unique address such as the Internet Protocol (IP) address and the World Wide Name (WWN).

The BEPK 2040 has a plurality of disk I/Fs 2041. The disk I/F 2041 functions as an interface for communicating with a storage device 2050 such as a hard disk drive (HDD) or a solid state drive (SSD). The BEPK 2040 relays data transmitted to and received from the storage device and the internal network 2060.

The MPPK 2020 has a plurality of microprocessors (MPs) 2021 and a local memory (LM) 2022. Each of the MPs 2021 and the LM 2022 are connected via a bus 2023.

The MP 2021 is an arithmetic device, and executes a program stored in the LM 2022. The LM 2022 stores programs for realizing functions for controlling the entire storage device 2000 such as logical partitioning, I/O control, and configuration control. The LM 2022 stores part of the control information for I/O control stored in a control memory 2032.

The CMPK 2030 has a cache memory 2031 and a control memory 2032. The cache memory 2031 and the control memory 2032 are volatile memories such as a dynamic random access memory (DRAM).

The cache memory 2031 temporarily stores data to be written to the storage device 2050 or data read from the storage device 2050. The control memory 2032 stores various types of information required for control, such as configuration information of the LU 2210 and the pool 2200. The control memory 2032 according to the present embodiment stores the LU management information T2000, the port management information T3000, the pool management information T4000, the parity group management information T5000, the source program management information T6000, and the resource group management information T7000.

The MP 2021 reads the configuration control program stored in the control memory 2032, loads the program into the LM 2022, and executes the program.

The MP 2021 that executes the configuration control program has a logical partitioning function of assigning storage resources to a resource group 2100 that is a logical partition.

The logical partitioning function assigns storage resources such as the LU 2210, the logical port, the pool 2200, and the parity group provided by the BEPK 2040 to the resource group 2100. At this time, the logical partitioning function gives an identifier of the resource group 2100 to the configuration information of the storage resource assigned to the resource group 2100. The MP 2021 that executes the configuration control program registers the resource group identifier and the storage resource assigning relationship in the resource group management information T7000.

Figure 4A:
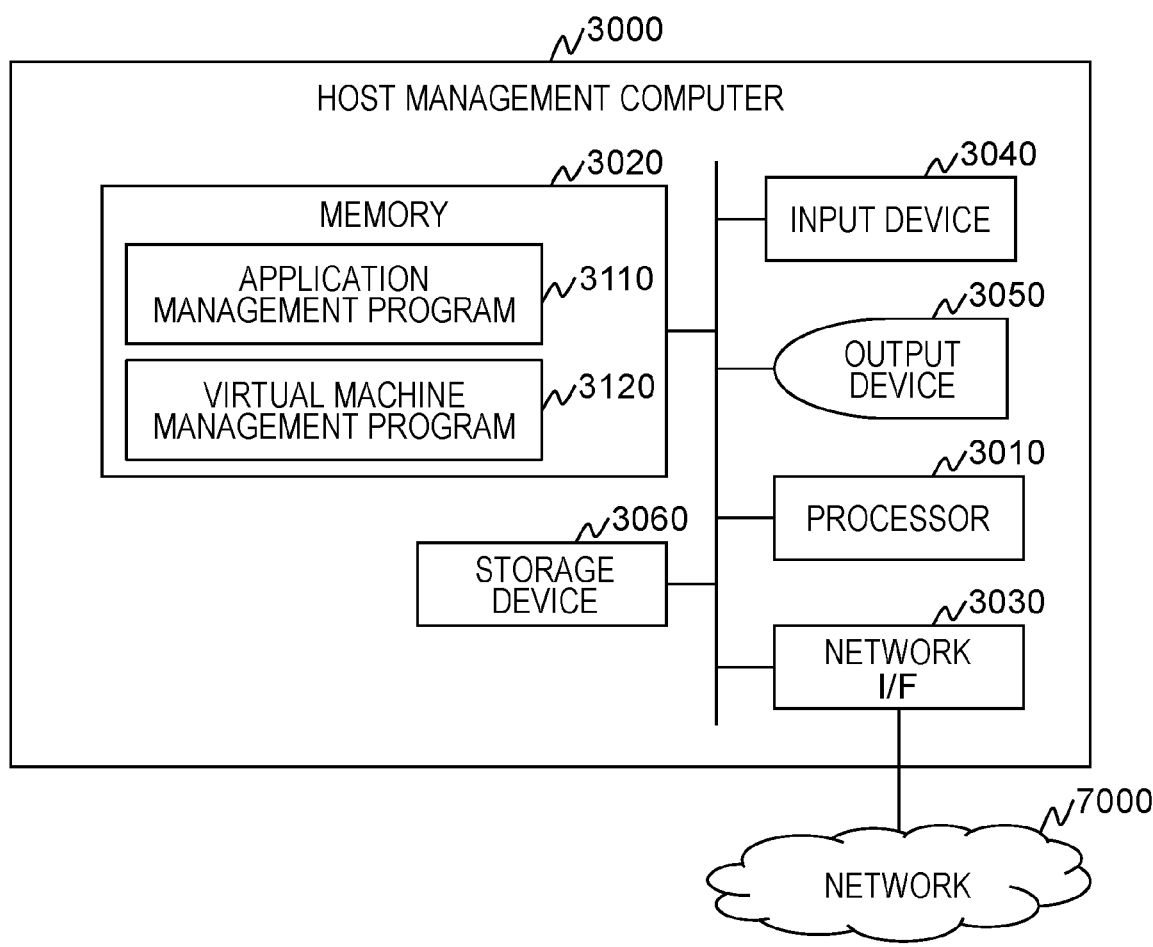
FIG. 4A is a diagram illustrating an example of a configuration of a host management computer according to the first embodiment.
Figure 4B:
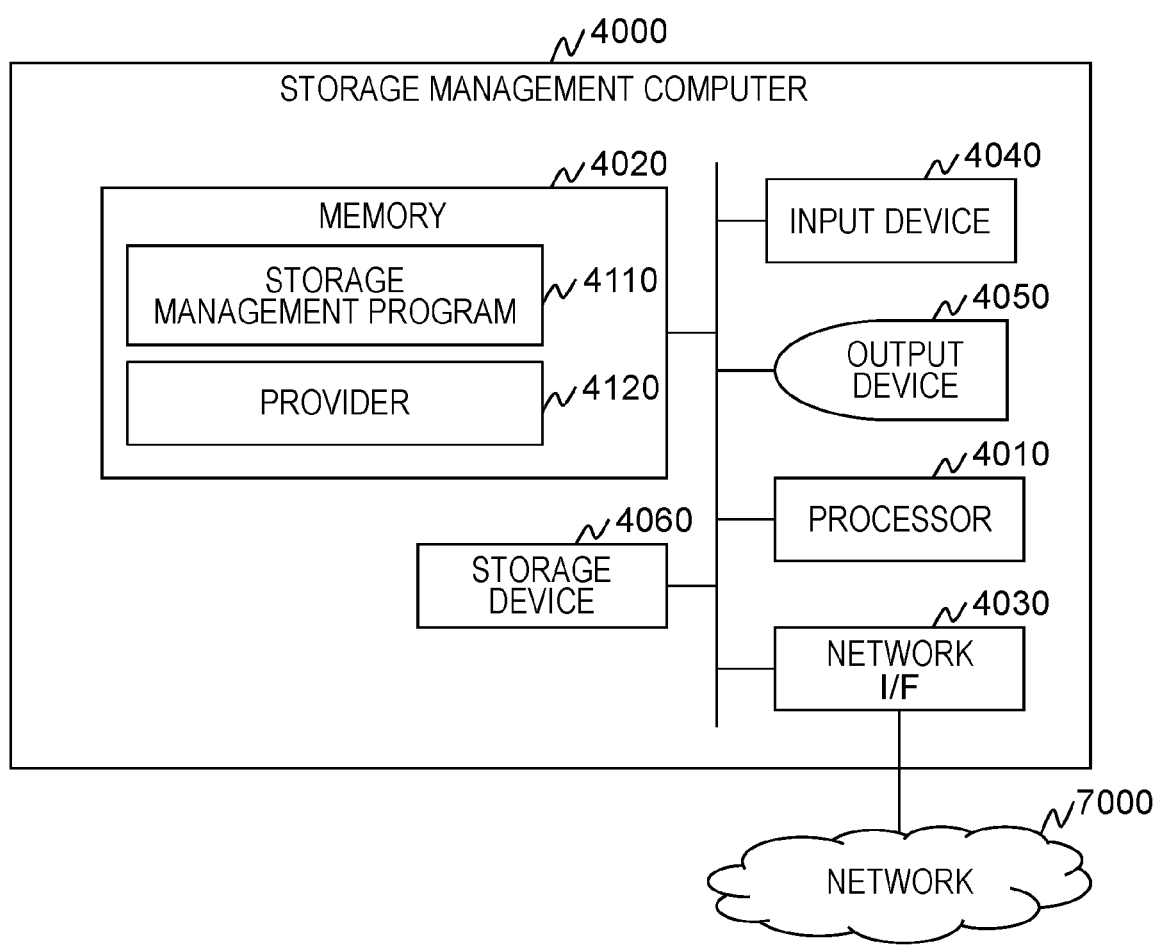
FIG. 4B is a diagram illustrating an example of a configuration of a storage management computer according to the first embodiment.

FIG. 4A is a diagram illustrating an example of a configuration of the host management computer 3000 according to the first embodiment. FIG. 4B is a diagram illustrating an example of a configuration of the storage management computer 4000 according to the first embodiment. The configurations of the host management computer 3000 and the storage management computer 4000 of the first embodiment have the same configuration.

The host management computer 3000 has a processor 3010, a memory 3020, a network I/F 3030, an input device 3040, an output device 3050, and a storage device 3060. The pieces of hardware are connected to each other via an internal bus.

The storage management computer 4000 has a processor 4010, a memory 4020, a network I/F 4030, an input device 4040, an output device 4050, and a storage device 4060. The pieces of hardware are connected to each other via an internal bus.

The processors 3010 and 4010 are similar hardware to the processor 1010, the memories 3020 and 4020 are similar hardware to the memory 1020, and the network I/Fs 3030 and 4030 are similar hardware to the network I/F 1030. The input devices 3040 and 4040 are similar hardware to the input device 1040, and the output devices 3050 and 4050 are similar hardware to the output device 1050.

The memory 3020 stores the application management program 3110 and the virtual machine management program 3120, and the memory 4020 stores the storage management program 4110 and the provider 4120.

The storage devices 3060 and 4600 are storage devices such as an HDD and an SSD. The storage device 3060 stores an execution log of the management program or the like.

The storage administrator 30 uses the storage management program 4110 to manage the configurations of the storage device 2000 such as the pool 2200 and the parity group.

Next, the data structure of information used for system control will be described.

FIG. 5 is a diagram illustrating an example of a data structure of the account management information T1000 held by the authentication server 5000 according to the first embodiment.

The account management information T1000 includes entries including a user ID (T1010), a password (T1020), a user group ID (T1030), and a role (T1040). One entry corresponds to one user.

The user ID (T1010) is a field for storing an identifier for uniquely identifying the user. The password (T1020) is a field for storing the password set by the user. The user group ID (T1030) is a field for storing an identifier for uniquely identifying the user group to which the user belongs. The role (T1040) is a field for storing information indicating the role assigned to the user. In this embodiment, roles are set for each user group.

For the role (T1040), the following types of roles are set. A role starting from "STORAGE" indicates the operation authority for the storage resource, a role starting from "VM_" indicates the operation authority for the VM 1290 and the resource on the host computer 1000 related to the VM 1290, and a role starting from "APPLICATION" indicates the operation authority for the application program on the OS.

Here, the outline of the authentication/authorization processing will be described.

The authentication server 5000 compares the identifier and password of the user included in the execution request transmitted from the source program with the user ID (T1010) and the password (T1020). If there is a matching entry, the authentication server 5000 responds to the source program with a ticket indicating the authentication certificate.

The source program transmits a role acquisition request including a ticket to the authentication server 5000. The authentication server 5000 searches for an entry corresponding to the ticket, and transmits a response including the values stored in the user group ID (T1030) and the role (T1040) of the found entry to the source program.

When the source program receives a response, if the role corresponding to the designated resource is not included in the received response, the source program rejects the request from the administrator. This rejection due to the fact that the role is out of target may be made on the storage device side in S2050 to be described later. When using the API of another program, the source program can give the ticket acquired from the authentication server 5000 to the request to perform single sign-on. The ticket includes an identifier of the user, an identifier of the user group, a role, or the like.

FIG. 6 is a diagram illustrating an example of a data structure of the LU management information T2000 stored in the control memory 2032 according to the first embodiment.

The LU management information T2000 includes an entry including an LU ID (T2010), a capacity (T2020), a pool ID (T2030), a resource group ID (T2040), and a port ID (T2050). One entry corresponds to one LU 2210.

The LU ID (T2010) is a field for storing an identifier for uniquely identifying the LU 2210. The capacity (T2020) is a field for storing the capacity of the LU 2210. The pool ID (T2030) is a field for storing an identifier for uniquely identifying the pool 2200 to which the LU 2210 belongs. The resource group ID (T2040) is a field for storing an identifier for uniquely identifying the resource group 2100 to which the LU 2210 is assigned. The port ID (T2050) is a field for storing an identifier for uniquely identifying the port through which the host computer 1000 accesses the LU 2210.

FIG. 7 is a diagram illustrating an example of a data structure of the port management information T3000 stored in the control memory 2032 according to the first embodiment.

The port management information T3000 includes entries including a port ID (T3010), a WWN (T3020), an initiator WWN (T3030), and a resource group ID (T3040). One entry corresponds to one port (logical port) 2220.

The port ID (T3010) is a field for storing an identifier for uniquely identifying a port. The WWN (T3020) is a field for storing a target WWN of a port. The initiator WWN (T3030) is a field for storing an initiator WWN of the HBA 1060 of the host computer 1000. The resource group ID (T3040) is a field for storing an identifier for uniquely identifying the resource group 2100 to which the port is assigned.

FIG. 8 is a diagram illustrating an example of a data structure of the pool management information T4000 stored in the control memory 2032 according to the first embodiment.

The pool management information T4000 includes entries including a pool ID (T4010), a capacity (T4020), a free space (T4030), a parity group ID (T4040), and a resource group ID (T4050). One entry corresponds to one pool 2200.

The pool ID (T4010) is a field for storing an identifier for uniquely identifying the pool 2200. The capacity (T4020) is a field for storing the capacity of the pool 2200. The free capacity (T4030) is a field for storing unused capacity of the capacity of the pool 2200. The parity group ID (T4040) is a field for storing an identifier for uniquely identifying a parity group that provides a storage region included in the pool 2200. Here, the parity group is a set of physical disks included in the RAID. The resource group ID (T4050) is a field for storing an identifier for uniquely identifying the resource group 2100 to which the pool 2200 is assigned.

FIG. 9 is a diagram illustrating an example of a data structure of the parity group management information T5000 stored in the control memory 2032 according to the first embodiment.

The parity group management information T5000 includes entries including a parity group ID (T5010), RAID information (T5020), disk information (T5030), and capacity (T5040). One entry corresponds to one parity group.

The parity group ID (T5010) is a field for storing an identifier for uniquely identifying a parity group. The RAID information (T5020) is a field for storing the RAID configuration of the parity group. The disk information (T5030) is a field for storing identifiers of physical disks included in the parity group. The capacity (T5040) is a field for storing the capacity of the storage region included in the parity group.

FIG. 10 is a diagram illustrating an example of a data structure of the source program management information T6000 stored in the control memory 2032 according to the first embodiment.

The source program management information T6000 includes entries including a source program IP address (T6010), a type (T6020), and a role (T6030). One entry corresponds to one source program.

The initiator IP address (T6010) is a field for storing an IP address assigned to the management port to which the source program transmits a request. The type (T6020) is a field for storing the type of the source program.

As will be described later, when accepting an operation request for the storage resource, the configuration control program 2300 controls so as to accept only the operation request from the user account to which the role set in the role (T6030) has been given.

FIG. 11 is a diagram illustrating an example of a data structure of the resource group management information T7000 stored in the control memory 2032 according to the first embodiment.

The resource group management information T7000 includes entries including a resource group ID (T7010), a user group ID (T7020), a role (T7030), and a source program IP address (T7040). One entry corresponds to one resource group.

The resource group ID (T7010) is a field for storing an identifier for uniquely identifying a resource group.

The user group ID (T7020), the role (T7030), and the source program IP address (T7040) are fields for storing values related to the storage resources assigned to the resource group. In the description below, a storage resource assigned to a resource group is described as an assigned storage resource.

The user group ID (T7020) is a field for storing an identifier for uniquely identifying the user group that is permitted to access the assigned storage resource. The role (T7030) is a field for storing the roles necessary for operating the assigned storage resource. The source program IP address (T7040) is a field for storing the IP address assigned to the management port used by the source program permitted to access the assigned storage resources.

Next, the processing executed in the system will be described.

Figure 12:
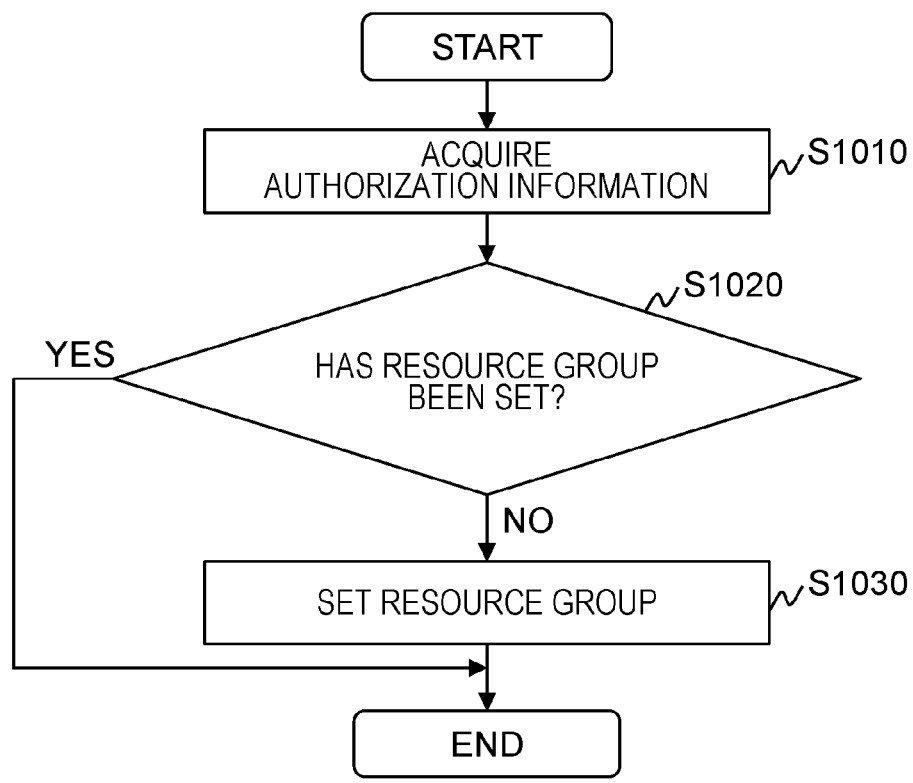
FIG. 12 is a flowchart for explaining an example of detection processing executed by a configuration control program according to the first embodiment.

FIG. 12 is a flowchart for explaining an example of detection processing executed by the configuration control program 2300 according to the first embodiment.

The source program transmits a detection request for detecting the storage device 2000. The detection request includes the ticket acquired from the authentication server 5000, the IP address assigned to the management port used at the time of transmission of the detection request, and the type of the source program. When the detection request is transferred via the provider 4120 or the like, the provider 4120 or the like includes, in the detection request, the IP address given to the program or the device to be passed together with the IP address for transmission of the search request.

When receiving the detection request, the configuration control program 2300 starts the detection processing described below.

The configuration control program 2300 analyzes the detection request (step S1010).

Specifically, the configuration control program 2300 acquires the authorization information from the ticket included in the detection request, and acquires the IP address included in the detection request.

Next, the configuration control program 2300 refers to the source program management information T6000 and determines whether a resource group of the source program that has transmitted the detection request is set (step S1020).

Specifically, the configuration control program 2300 searches for an entry whose source program IP address (T6010) matches the IP address of the source program that has transmitted the detection request. If there is an entry, the configuration control program 2300 determines that a resource group of the source program that has transmitted the detection request is set.

When the resource group of the source program that has transmitted the detection request is set, the configuration control program 2300 ends the detection processing.

When the resource group of the source program that has transmitted the detection request is not set, the configuration control program 2300 sets the resource group of the source program (step S1030). Thereafter, the configuration control program 2300 ends the detection processing. Specifically, the following processing is executed.

The configuration control program 2300 adds an entry to the source program management information T6000 and sets the IP address included in the detection request in the source program IP address (T6010) of the added entry. The configuration control program 2300 sets the type and role of the source program included in the authorization information in the type (T6020) and role (T6030) of the added entry.

The configuration control program 2300 adds an entry to the resource group management information T7000 and sets a resource group identifier in the resource group ID (T7010) of the added entry. The configuration control program 2300 sets the role included in the authorization information in the role (T7030) of the added entry and also sets the IP address included in the detection request in the source program IP address (T7040).

Note that when the detection request is transferred via the provider 4120 or the like, the IP address of the source program that has transmitted the detection request and the IP address of the provider 4120 or the like are set in the IP address (T7040).

In the detection processing, a resource group 2100 to which storage resources to be used by the source program are assigned is generated for each source program. In the first embodiment, the source program IP address (T7040) is provided as information (owner information) indicating the owner of the storage resource assigned to the resource group 2100.

The timing of the generation of the resource group management information T7000 is not limited to the reception of the detection request. In order to use the storage resource, when access from the source program is detected, similar processing may be executed.

Figure 13:
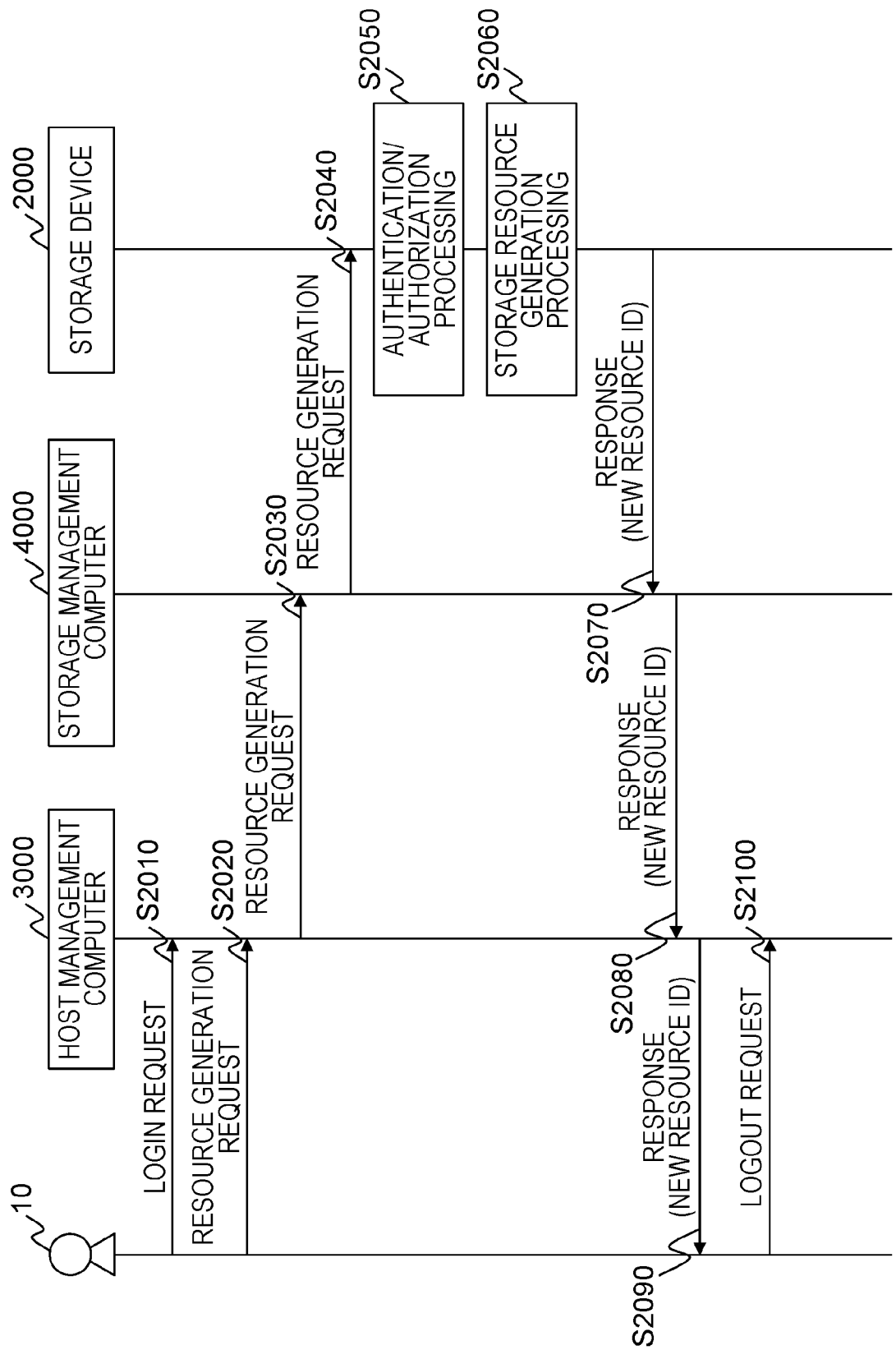
FIG. 13 is a sequence diagram illustrating an example of a flow of processing of generating a new storage resource in the system of the first embodiment.

FIG. 13 is a sequence diagram illustrating an example of a flow of processing of generating a new storage resource in the system of the first embodiment.

The VM administrator 10 uses the GUI or CLI provided by the virtual machine management program 3120 (source program) to input a login request for logging in the virtual machine management program 3120 from the operation terminal to the host management computer 3000 (step S2010).

When receiving the login request, the host management computer 3000 transfers the request to the authentication server 5000. The virtual machine management program 3120 acquires a ticket from the authentication server 5000 that has authenticated the user.

After confirming the response to the login request, the VM administrator 10 inputs a resource generation request managed by the virtual machine management program 3120 to the host management computer 3000 (step S2020). Here, it is assumed that a data store generation request for storing the image of the VM 1290 is input.

The virtual machine management program 3120 uses the API provided by the provider 4120 to transmit the generation request of the LU 2210 used as the data store to the storage management computer 4000 (step S2030). A ticket acquired from the authentication server 5000 is given to the generation request.

When receiving the generation request of the LU 2210, the provider 4120 of the storage management computer 4000 transmits the generation request to the storage device 2000 (step S2040). At this time, the provider 4120 may select the pool 2200 for generating the LU 2210 and include the identifier of the pool 2200 in the generation request.

The configuration control program 2300 of the storage device 2000 executes authentication/authorization processing (step S2050). Details of the authentication/authorization processing will be described with reference to FIG. 14. When the operation by the VM administrator 10 is permitted, the configuration control program 2300 executes storage resource generation processing (step S2060). Details of the storage resource generation processing will be described with reference to FIG. 15.

The configuration control program 2300 transmits a response including the generated identifier of the LU 2210 to the storage management computer 4000 (step S2070). The provider 4120 of the storage management computer 4000 transfers the response to the host management computer 3000 (step S2080). The virtual machine management program 3120 of the host management computer 3000 outputs the response to the VM administrator 10 (step S2090).

When the necessary operations are completed, the VM administrator 10 inputs a logout request to the host management computer 3000 (step S2100).

Note that the operation performed by the application administrator 20 using the application management program 3110 is performed in a similar process flow.

Figure 14:
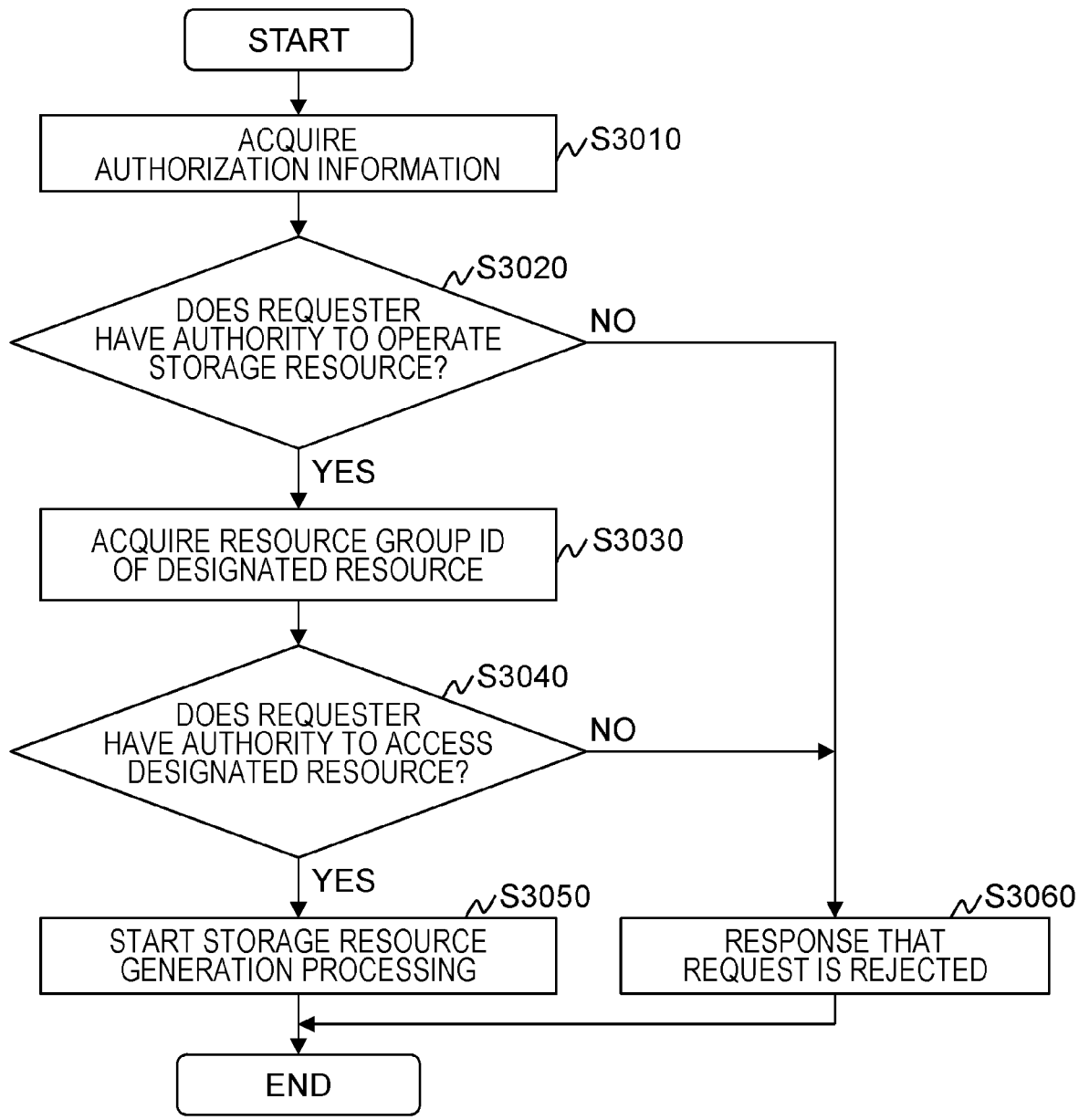
FIG. 14 is a flowchart for explaining an example of authentication/authorization processing executed when the storage device of the first embodiment generates a new resource.

FIG. 14 is a flowchart for explaining an example of authentication/authorization processing executed when the storage device 2000 of the first embodiment generates a new resource.

When receiving the generation request of the LU 2210, the configuration control program 2300 acquires the authorization information from the ticket given to the request (step S3010).

Specifically, the configuration control program 2300 acquires the identifier of the user, the identifier of the user group, and the role from the authorization information. The configuration control program 2300 acquires the IP address from the generation request of the LU 2210. The configuration control program 2300 refers to any of the LU management information T2000, the port management information T3000, the pool management information T4000, and the parity group management information T5000 to specify a resource group to which the operation target storage resource is assigned. For example, in the case of a request for generating an LU, the resource group ID T4050 is specified on the basis of the pool management information T4000 by using the identifier of the pool for generating the LU included in the request.

In the case of the generation request of the LU 2210 directly transmitted from the source program, the request includes only the IP address of the source program. In the case of the generation request of the LU 2210 transmitted via the provider 4120, the request includes the source program and the IP address of the provider 4120.

Next, the configuration control program 2300 determines whether the requester (VM administrator 10) has authority to operate the storage resource (step S3020).

Specifically, the configuration control program 2300 searches for an entry in which the identifier of the specified resource group is set in the resource group ID (T7010). The configuration control program 2300 compares the user group ID (T7020) and the role (T7030) of the found entry with the identifier and the role of the user group included in the authorization information, and determines whether the requester has authority to operate the storage resource. Here, the role used for authentication may be the role of the source program (T6030) or the role of the user (T1040). Roles used for authentication may be used properly. For example, the role of the user may be used when the user directly accesses the configuration control program 2300, and the role of the user used for the login authentication to the source program (role common to the user and the source program) may be used when the user accesses via the source program.

When it is determined that the requester does not have authority to operate the storage resource, the configuration control program 2300 responds that the request is rejected (step S3060) and ends the processing.

When it is determined that the requester has authority to operate the storage resource, the configuration control program 2300 acquires the identifier of the resource group to which the designated resource belongs (step S3030).

Specifically, the configuration control program 2300 refers to the management information corresponding to the designated resource and acquires the identifier of the resource group set in the entry corresponding to the designated resource.

In the first embodiment, since the pool 2200 is a designated resource, the configuration control program 2300 refers to the pool management information T4000 and searches for an entry that matches the identifier of the pool 2200 in which the pool ID (T4010) is designated. The configuration control program 2300 acquires the identifier of the resource group set in the resource group ID (T4050) of the found entry.

Next, the configuration control program 2300 determines whether the requester has authority to access the designated resource (step S3040). The processing of step S3040 is processing for determining whether the requester is the owner of the resource group to which the designated resource is assigned. Specifically, the following processing is executed.

(Processing 1) The configuration control program 2300 refers to the resource group management information T7000, and searches for an entry in which values of the resource group ID (T7010) and the user group ID (T7020) match the acquired identifier of the resource group and identifier of the user group.

(Processing 2) The configuration control program 2300 determines whether the IP address acquired from the generation request of the LU 2210 is set in the source program IP address (T7040) of the found entry. When the IP address acquired from the generation request of the LU 2210 is set to the source program IP address (T7040) of the found entry, the configuration control program 2300 determines that the requester has authority to access the designated resource.

Note that when a plurality of IP addresses is set in the source program IP address (T7040), the configuration control program 2300 determines whether all the IP addresses set in the source program IP address (T7040) match all the IP addresses acquired from the generation request of the LU 2210. When all the IP addresses set in the source program IP address (T7040) match all the IP addresses acquired from the generation request of the LU 2210, the configuration control program 2300 determines that the requester has authority to access the designated resource. The above is the description of the processing of step S3040.

When it is determined that the requester does not have authority to access the designated resource, the configuration control program 2300 responds that the request is rejected (step S3060) and ends the processing.

When it is determined that the requester has authority to access the designated resource, the configuration control program 2300 responds that the request is accepted and starts the storage resource generation processing (step S3050).

As illustrated in FIG. 14, an owner can be set for each storage resource.

Figure 15:
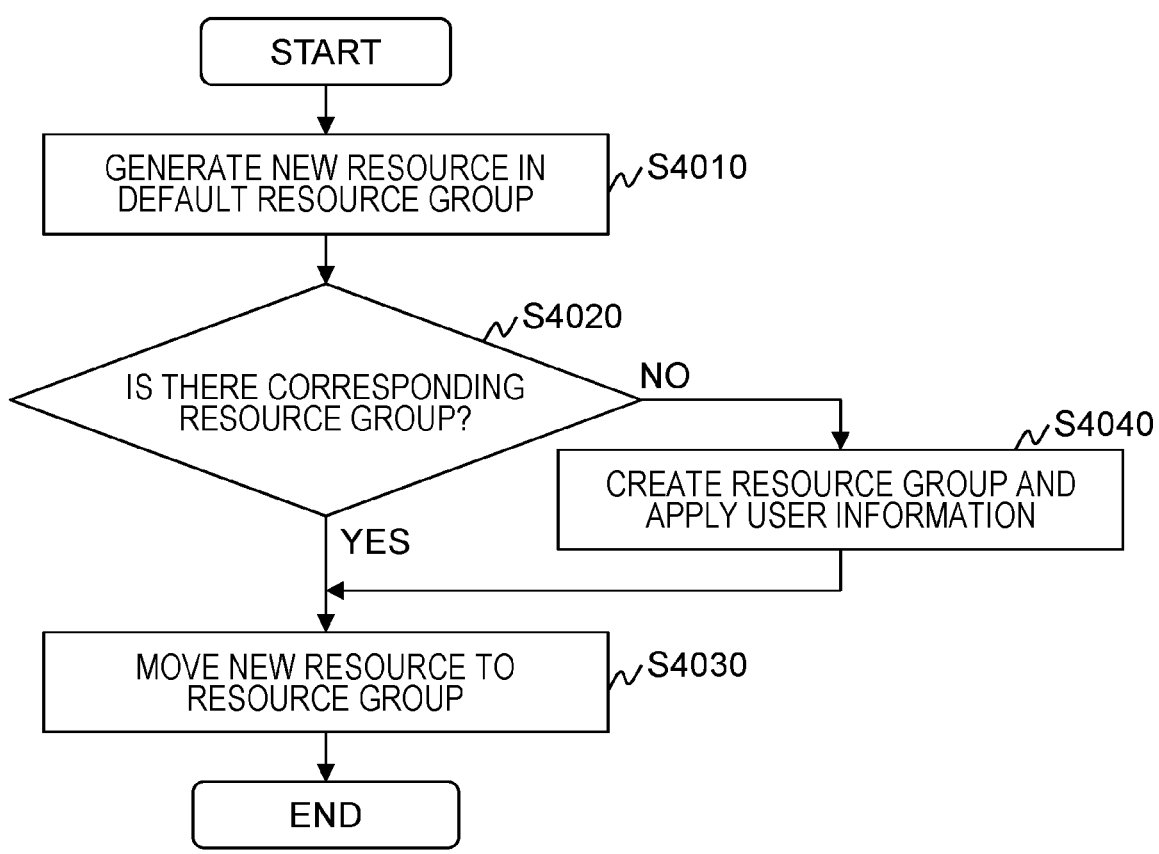
FIG. 15 is a flowchart for explaining an example of storage resource generation processing executed by the storage device of the first embodiment.

FIG. 15 is a flowchart for explaining an example of storage resource generation processing executed by the storage device 2000 of the first embodiment.

The configuration control program 2300 generates a new resource in the default resource group (step S4010). In the case of generating the LU 2210, the following processing is executed.

The configuration control program 2300 uses the designated pool 2200 to generate the LU 2210, and sets the logical port for accessing the LU 2210.

The configuration control program 2300 adds an entry to the LU management information T2000 and sets the identifier of the LU ID (T2010) of the added entry. The configuration control program 2300 sets the capacity of the LU 2210, the identifier of the pool that has been used for generating the LU 2210, and the identifier of the set logical port to the capacity (T2020), the pool ID (T2030), and the port ID (T2050) of the added entry. The configuration control program 2300 sets "RSGO" in the resource group ID (T2040) of the added entry.

The configuration control program 2300 refers to the port management information T3000 and searches for an entry in which the port ID (T3010) matches the port ID (T2050) of the added entry. The configuration control program 2300 sets "RSGO" in the resource group ID (T2040) of the found entry. The above is the description of the processing of step S4010.

Next, the configuration control program 2300 moves the new resource to the resource group of the requester (assigned resource group) (step S4020). Thereafter, the configuration control program 2300 ends the processing. In step S4020, the following processing is executed.

The configuration control program 2300 refers to the LU management information T2000 and sets the identifier of the assigned resource group in the resource group ID (T2040) of the entry added in step S4010.

The configuration control program 2300 refers to the port management information T3000 and searches for an entry in which the port ID (T3010) matches the port ID (T2050) of the added entry. The configuration control program 2300 sets the identifier of the assigned resource group in the resource group ID (T2040) of the found entry. The above is the description of the processing of step S4020.

Figure 16:
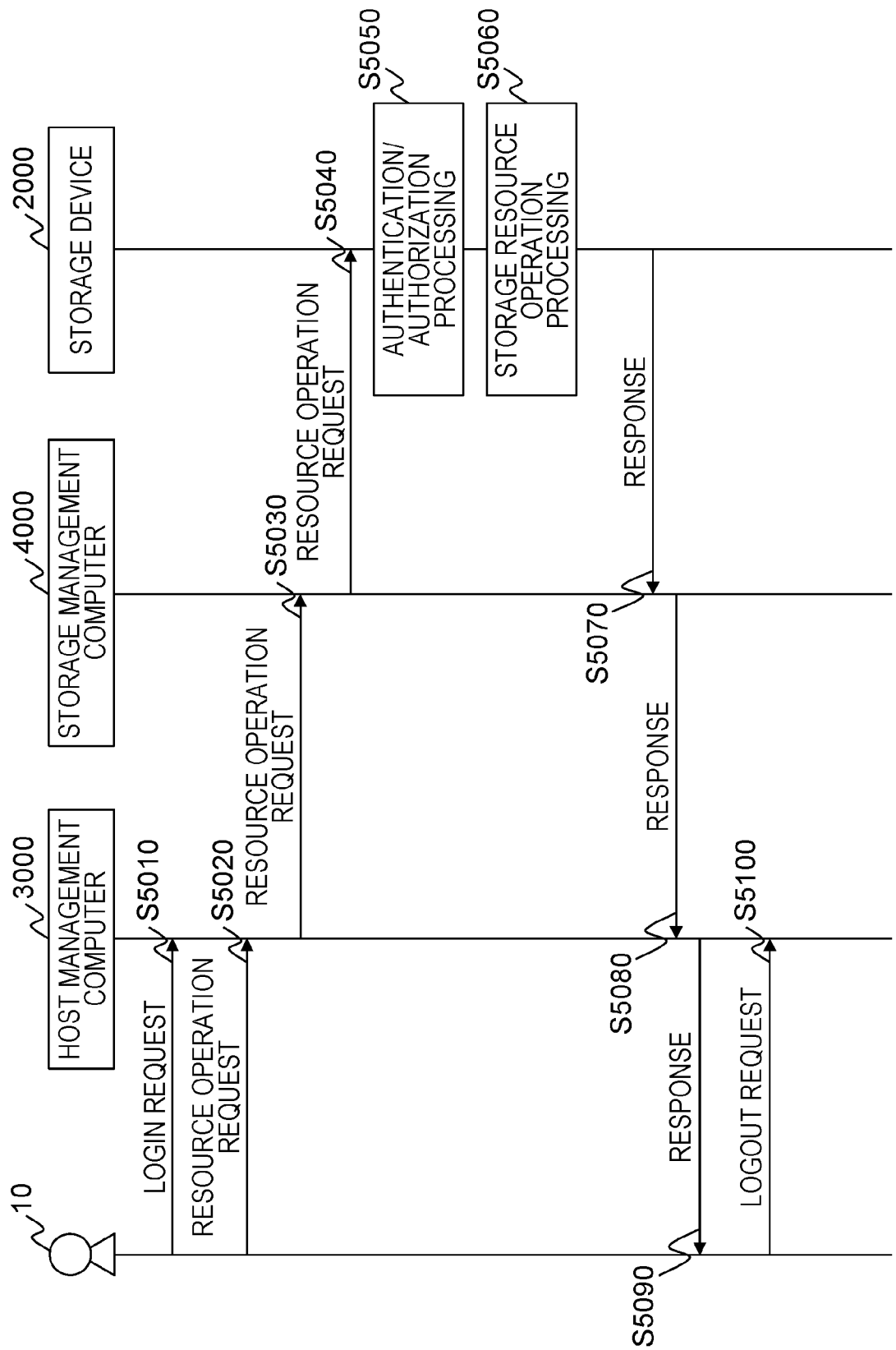
FIG. 16 is a sequence diagram illustrating an example of a flow of processing of operating an existing storage resource in the system of the first embodiment.

FIG. 16 is a sequence diagram illustrating an example of a flow of processing of operating an existing storage resource in the system of the first embodiment.

The VM administrator 10 uses the GUI or CLI provided by the virtual machine management program 3120 (source program) to input a login request for logging in the virtual machine management program 3120 to the host management computer 3000 (step S5010).

When receiving the login request, the host management computer 3000 transfers the request to the authentication server 5000. The host management computer 3000 acquires a ticket from the authentication server 5000 that has authenticated the user.

After confirming the response to the login request, the VM administrator 10 inputs a resource operation instruction managed by the virtual machine management program 3120 to the host management computer 3000 (step S5020).

The virtual machine management program 3120 uses the API provided by the provider 4120 to transmit the storage resource operation request to the storage management computer 4000 (step S5030). The operation request includes the ticket acquired from the authentication server 5000.

Upon receiving the storage resource operation request, the provider 4120 of the storage management computer 4000 transfers the operation request to the storage device 2000 (step S5040).

The configuration control program 2300 of the storage device 2000 executes authentication/authorization processing (step S5050). When it is determined that the VM administrator 10 has a valid role and authority to access, the configuration control program 2300 executes storage resource operation processing (step S5060).

The configuration control program 2300 transmits a response including the processing result to the storage management computer 4000 (step S5070). The provider 4120 of the storage management computer 4000 transmits the response to the host management computer 3000 (step S5080). The virtual machine management program 3120 of the host management computer 3000 outputs the response to the VM administrator 10 (step S5090).

When the necessary operations are completed, the VM administrator 10 inputs a logout request to the host management computer 3000 (step S5100).

Note that the operation performed by the application administrator 20 using the application management program 3110 is performed in a similar process flow.

Figure 17:
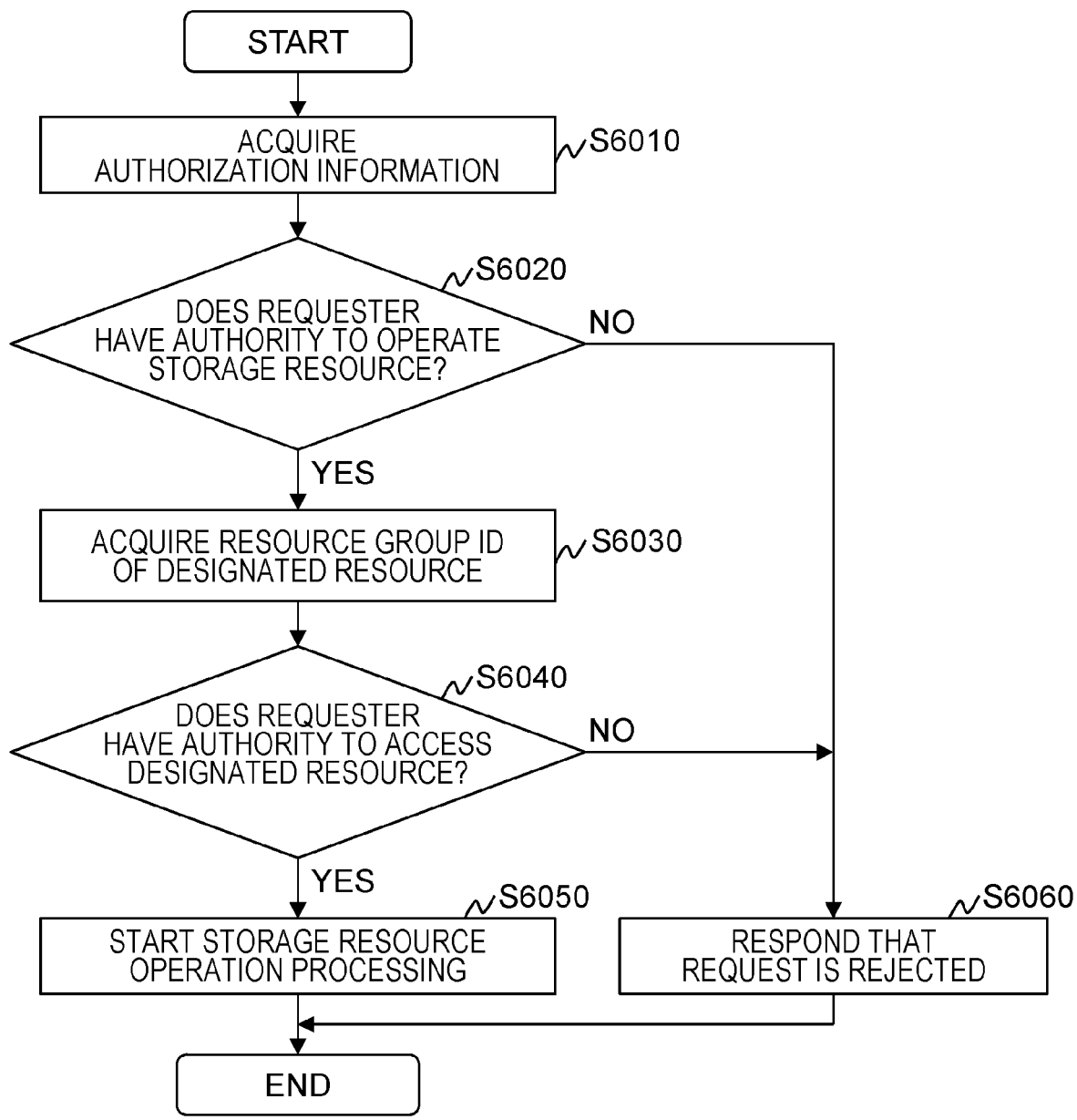
FIG. 17 is a flowchart for explaining an example of authentication/authorization processing executed when the storage device of the first embodiment operates an existing resource.

FIG. 17 is a flowchart for explaining an example of authentication/authorization processing executed when the storage device 2000 of the first embodiment operates an existing resource.

The processing from step S6010 to step S6040 is the same as the processing from step S3010 to step S3020. The processing of step S6060 is the same as the processing of step S3060. In step S6020, the resource management group to which the operation request target VM 1290 belongs is determined on the basis of the identifier of the port 2220 to which the VM is connected and the port ID (T3010) of the port management information T3000.

In step S6040, when it is determined that the requester has authority to access the designated resource, the configuration control program 2300 responds that the request is accepted and starts the storage resource operation processing (step S6050).

As illustrated in FIG. 17, when the requester has authority to operate the storage resource but is not the owner of the resource group to which the operation target storage resource is assigned, the request is rejected. As a result, it is possible to prevent a legitimate user from operating resources managed by other legitimate users.

In the system described in the first embodiment, storage resources are managed on a resource group basis. Since resource groups are managed in association with user groups, operations on resources can be controlled on a user group basis.

At the time of setting the resource group, the configuration control program 2300 manages the authorization information managed by the authentication server 5000 in association with the resource group. When receiving the resource operation request, the configuration control program 2300 can check whether the valid role is held by comparing the authorization information that has been associated with the resource group and the newly acquired authorization information. With this configuration, there is no need to set a role in the storage device 2000 in advance.

At the time of setting the resource group, the configuration control program 2300 acquires the IP address as information for specifying the owner of the resource group, and manages the IP address in association with the resource group. When receiving the resource operation request, the configuration control program 2300 can check whether the requester is an owner of the valid resource group by comparing the IP address associated with the resource group and the IP address acquired from the request. With this configuration, it is possible to restrict the operation of illegal resources based on unauthorized access.

Although the first embodiment has been described with reference to the storage resource, a similar configuration can also be applied to a system that provides VM 1290 or the like as a resource.

Second Embodiment

The second embodiment is different from the first embodiment in the system configuration. Hereinafter, the second embodiment will be described focusing on the difference from the first embodiment.

Figure 18:
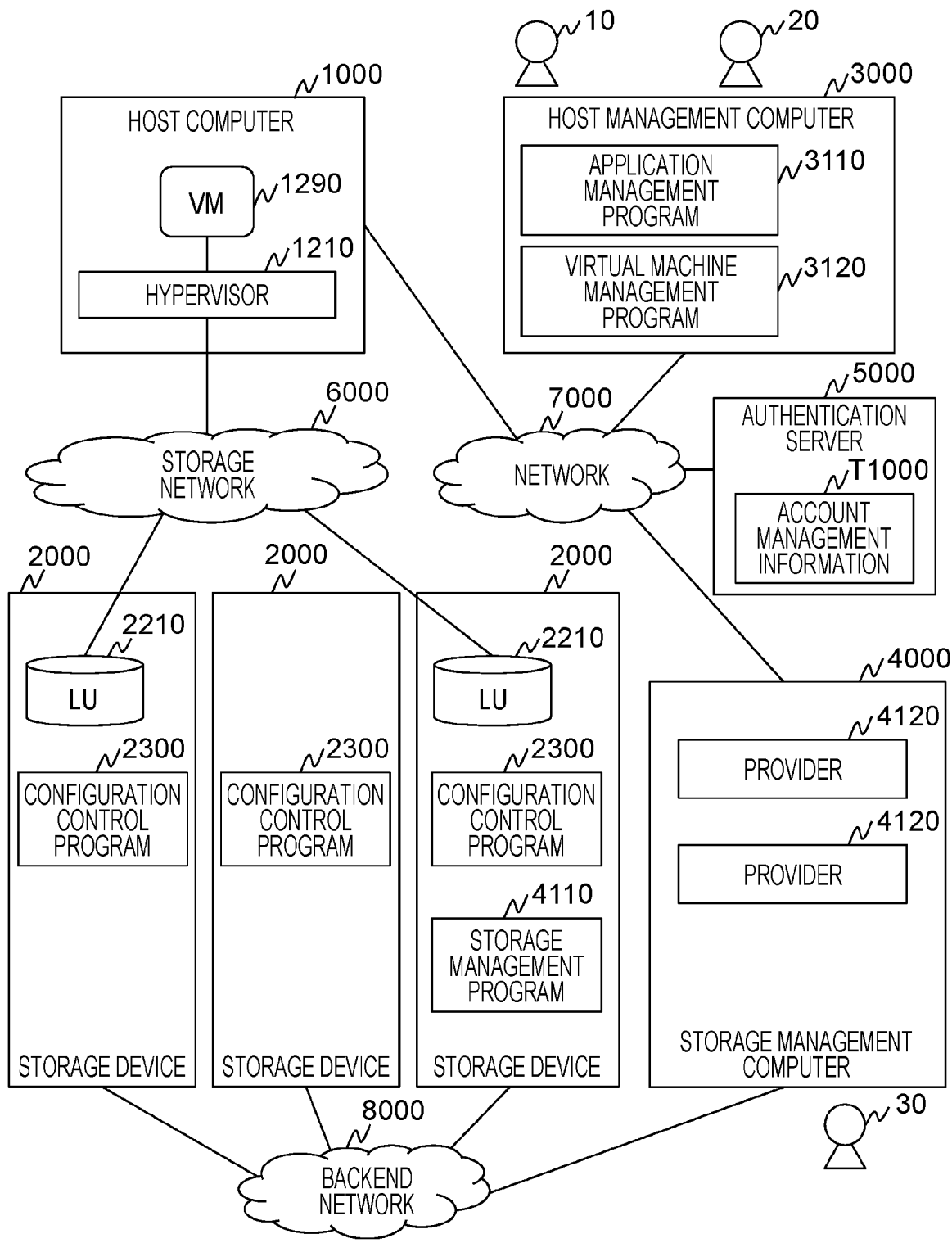
FIG. 18 is a diagram illustrating an example of a configuration of a system according to a second embodiment.

FIG. 18 is a diagram illustrating an example of a configuration of a system according to the second embodiment.

The system of the second embodiment includes a plurality of storage devices 2000. The plurality of storage devices 2000 is connected to each other via a backend network 8000. One storage device 2000 has a storage management program 4110 that supervises the control of each storage device 2000. The storage management computer 4000 of the second embodiment does not have the storage management program 4110.

The other configuration of the system of the second embodiment is the same as that of the system of the first embodiment. The hardware configuration of each device is the same as the hardware configuration of each device of the first embodiment.

In the second embodiment, the storage management program 4110 is set to receive a resource operation request from the provider 4120 or the like. The storage management program 4110 specifies the storage device 2000 that manages the operation target resource and transfers the resource operation request to the specified storage device 2000. The configuration control program 2300 of each storage device 2000 is set to accept only an operation request from the storage management program 4110. In the following description, the storage device 2000 having the storage management program 4110 is described as a master storage device 2000.

In the second embodiment, the master storage device 2000 holds information for managing the plurality of storage devices 2000. Here, information for the master storage device 2000 to manage the plurality of storage devices 2000 will be described.

Figure 19:
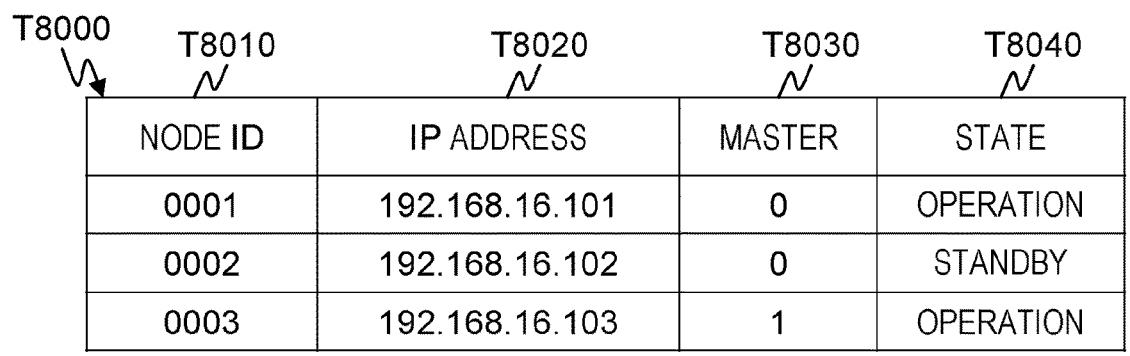
FIG. 19 is a diagram illustrating an example of a data structure of storage device management information held by a master storage device according to the second embodiment.

FIG. 19 is a diagram illustrating an example of a data structure of storage device management information T8000 held by the master storage device 2000 according to the second embodiment.

The storage device management information T8000 is information for managing the storage device 2000. The storage device management information T8000 is set in advance, and addition and deletion of entries are performed as addition and deletion of the storage device 2000 are performed.

The storage device management information T8000 includes entries including a node ID (T8010), an IP address (T8020), a master (T8030), and a state (T8040). One entry corresponds to one storage device 2000.

The node ID (T8010) is a field for storing the identifier of the storage device 2000. The IP address (T8020) is a field for storing the IP address assigned to the management port of the storage device 2000. The master (T8030) is a field for storing a value indicating whether it is a master. Here, the master represents the storage device 2000 that supervises the processing, that is, the master storage device 2000. In the master (T8030), either "1" indicating that it is a master or "0" indicating that it is not a master is set. The state (T8040) is a field for storing a value indicating the operating state of the storage device 2000. In the state (T8040), either "operation" indicating the operating state or "standby" indicating the non-operating state is set.

Figure 20:
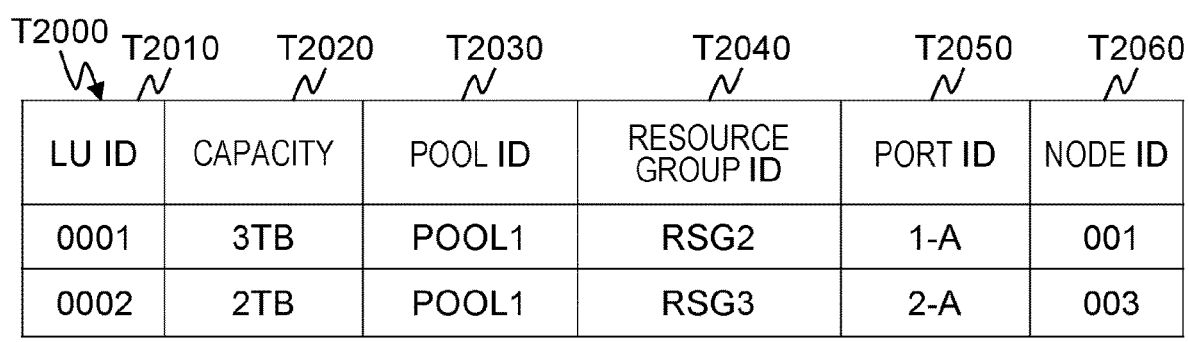
FIG. 20 is a diagram illustrating an example of a data structure of LU management information held by the master storage device according to the second embodiment.

FIG. 20 is a diagram showing an example of a data structure of the LU management information T2000 held by the master storage device 2000 according to the second embodiment.

The entry included in the LU management information T2000 includes a node ID (T2060). The node ID (T2060) is the same field as the node ID (T8010).

Note that the plurality of storage devices 2000 holds the LU management information T2000 described in the first embodiment.

FIG. 21 is a diagram illustrating an example of a data structure of the port management information T3000 held by the master storage device 2000 according to the second embodiment.

The entry included in the port management information T3000 includes a node ID (T3050). The node ID (T3050) is the same field as the node ID (T8010).

Note that the plurality of storage devices 2000 holds the port management information T3000 described in the first embodiment.

FIG. 22 is a diagram illustrating an example of a data structure of the pool management information T4000 held by the master storage device 2000 according to the second embodiment.

The entry included in the pool management information T4000 includes the node ID (T4050). The node ID (T4050) is the same field as the node ID (T8010).

Note that the plurality of storage devices 2000 holds the pool management information T4000 described in the first embodiment.

Figure 23:
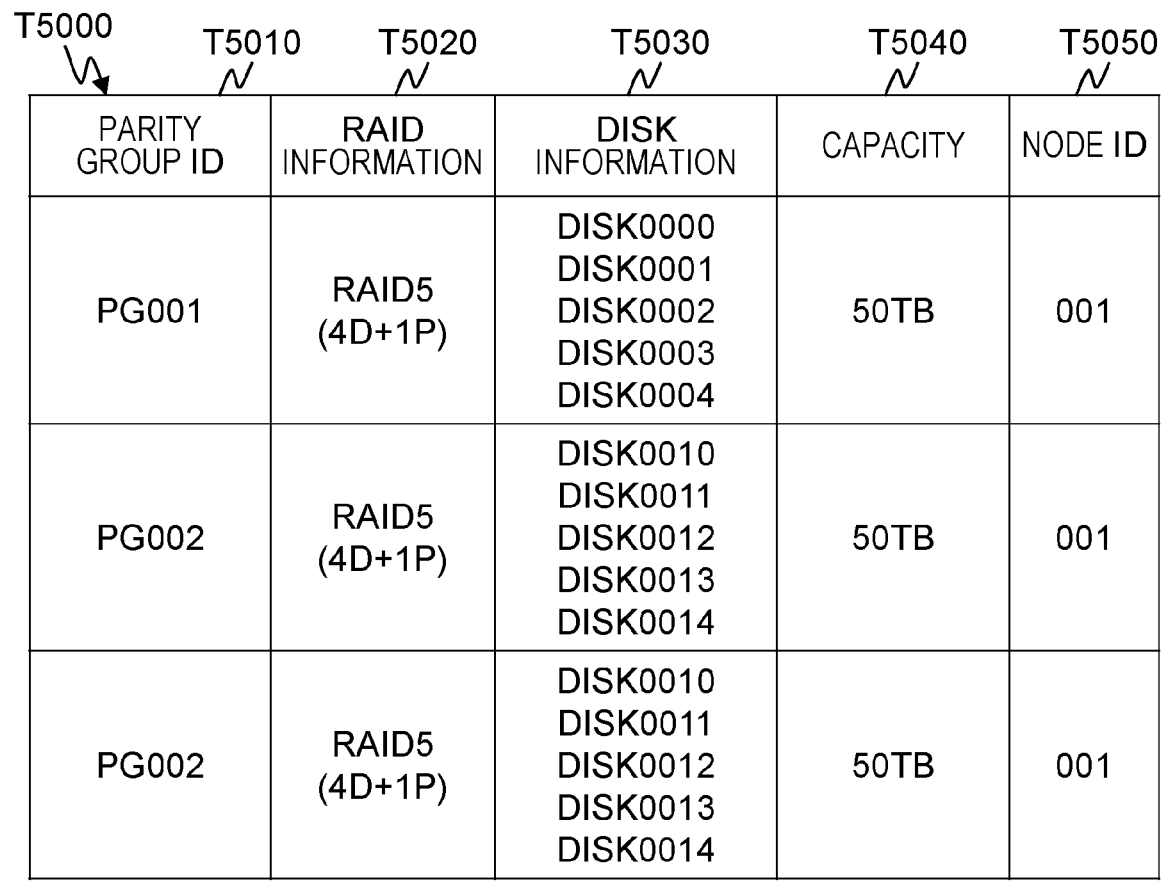
FIG. 23 is a diagram illustrating an example of a data structure of parity group management information held by the master storage device according to the second embodiment.

FIG. 23 is a diagram illustrating an example of a data structure of parity group management information T5000 held by the master storage device 2000 according to the second embodiment.

The entry included in the parity group management information T5000 includes the node ID (T5050). The node ID (T5050) is the same field as the node ID (T8010).

Note that the plurality of storage devices 2000 holds the parity group management information T5000 described in the first embodiment.

In the second embodiment, when receiving the resource operation request, the storage management program 4110 of the master storage device 2000 refers to at least any of the LU management information T2000, the port management information T3000, the pool management information T4000, and the parity group management information T5000 to specify the storage device 2000 to be the transfer destination of the request. The storage management program 4110 of the master storage device 2000 refers to the storage device management information T8000, acquires the IP address of the transfer destination storage device 2000, and transfers the request.

Processing performed when the configuration control program 2300 of each storage device 2000 receives a resource operation request is the same as that of the first embodiment, and thus description thereof is omitted.

Figure 24:
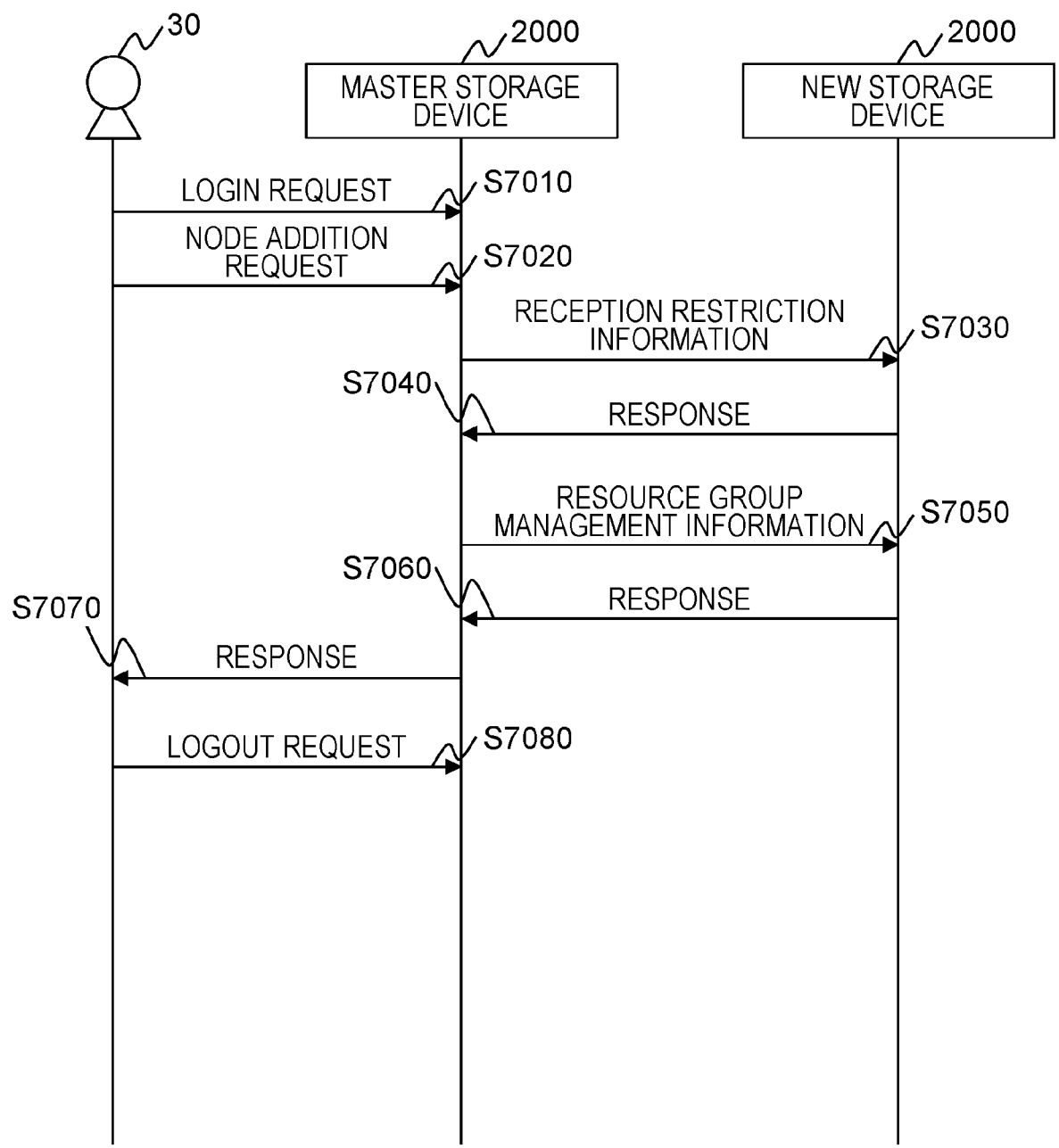
FIG. 24 is a sequence diagram illustrating an example of a flow of processing of adding a new storage device in the system of the second embodiment.

FIG. 24 is a sequence diagram illustrating an example of a flow of processing of adding a new storage device 2000 in the system of the second embodiment.

The storage administrator 30 uses the GUI or CLI provided by the storage management program 4110 to input a login request for logging in the storage management program 4110 to the master storage device 2000 (step S7010).

When receiving the login request, the master storage device 2000 transfers the request to the authentication server 5000. The storage management program 4110 acquires a ticket from the authentication server 5000 that has authenticated the user.

After confirming the response to the login request, the storage administrator 30 inputs an additional request of the new storage device 2000 to the master storage device 2000 (step S7020). The additional request includes the IP address of the new storage device 2000.

The storage management program 4110 transmits reception restriction information to the new storage device 2000 (step S7030). The reception restriction information is information for setting such that only an operation request from the master storage device 2000 is accepted.

When receiving the reception restriction information, the configuration control program 2300 of the new storage device 2000 stores the reception restriction information in the control memory 2032. Thereafter, the configuration control program 2300 of the new storage device 2000 transmits a response to the master storage device 2000 (step S7040).

The storage management program 4110 of the master storage device 2000 transmits the resource group management information T7000 to the new storage device 2000 (step S7050).

When receiving the resource group management information T7000, the configuration control program 2300 of the new storage device 2000 stores the resource group management information T7000 in the control memory 2032. Thereafter, the configuration control program 2300 of the new storage device 2000 transmits a response to the master storage device 2000 (step S7060).

The storage management program 4110 of the master storage device 2000 outputs to the storage administrator 30 a response notifying that the addition processing of the new storage device 2000 has been completed (step S7070).

Upon completion of the necessary operation, the storage administrator 30 inputs the logout request to the master storage device 2000 (step S7080).

Through the above processing, it is possible to control such that the master storage device 2000 accepts an operation request. The configuration control program 2300 of each storage device 2000 can realize access control on a resource group basis.

Third Embodiment

The third embodiment is different from the first embodiment in the system configuration. Hereinafter, the third embodiment will be described focusing on the difference from the first embodiment.

Figure 25:
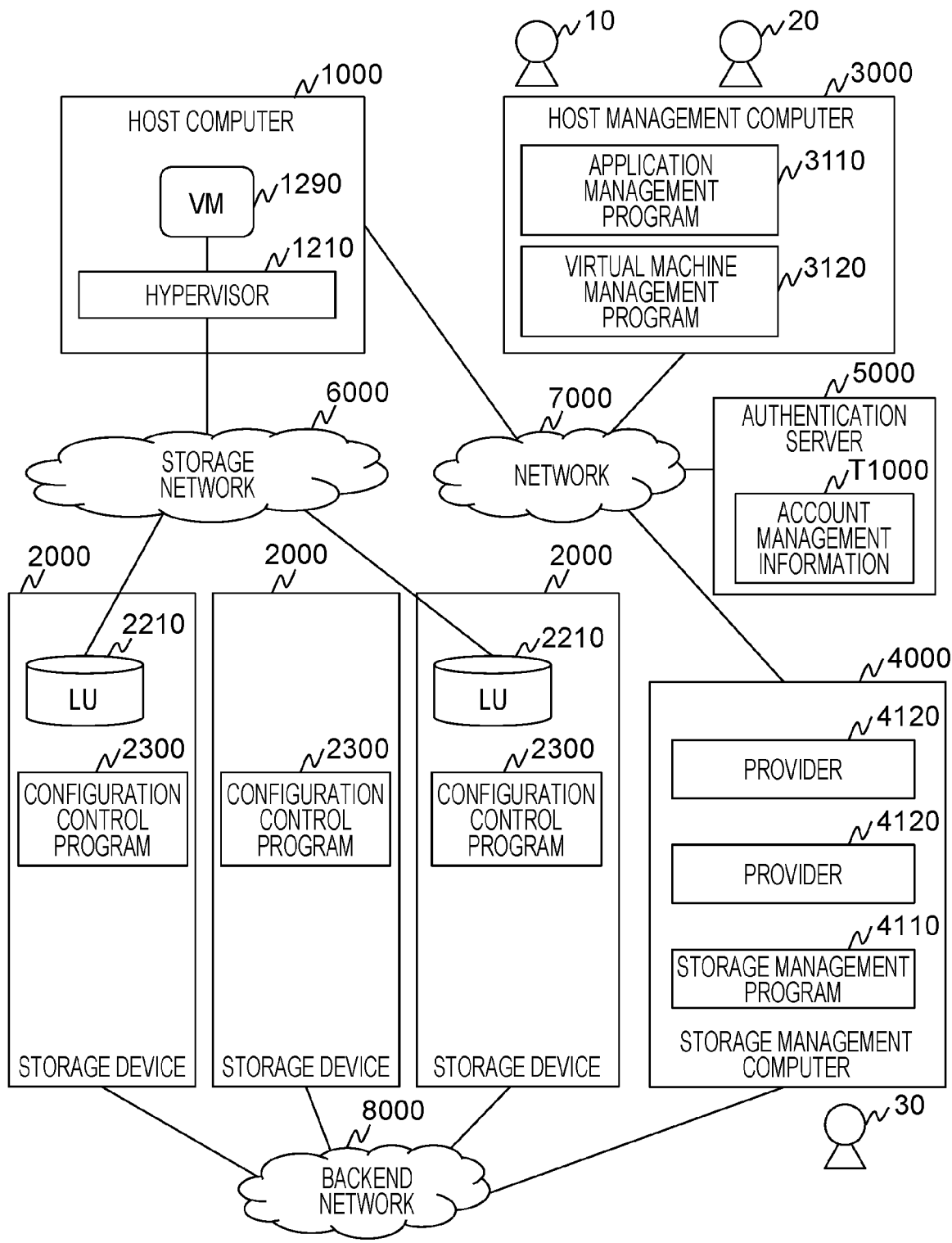
FIG. 25 is a diagram illustrating an example of a configuration of a system according to a third embodiment.

FIG. 25 is a diagram illustrating an example of a configuration of a system according to a third embodiment.

The system of the third embodiment includes a plurality of storage devices 2000. The plurality of storage devices 2000 is connected to each other via a backend network 8000. The system of the third embodiment is a system for integrating heterogeneous storage devices and providing them as one storage system to the host computer 1000.

The other configuration of the system of the third embodiment is the same as that of the system of the first embodiment. The hardware configuration of each device is the same as the hardware configuration of each device of the first embodiment. The software configuration of each device of the third embodiment is different from that of the first embodiment in that the storage management computer 4000 having the storage management program 4110 has the resource group management information T7000. The other configuration is the same as that of the first embodiment.

In the third embodiment, as similar to the second embodiment, the storage management program 4110 is set to receive a resource operation request from the provider 4120 or the like. The storage management program 4110 specifies the storage device 2000 that manages the operation target resource and transfers the resource operation request to the specified storage device 2000. The configuration control program 2300 of each storage device 2000 is set to accept only an operation request from the storage management program 4110.

The storage management program 4110 of the third embodiment has a similar function to the storage management program 4110 of the master storage device 2000 of the second embodiment.

According to the third embodiment, the storage management program 4110 that supervises the operation requests to the plurality of storage devices 2000 is arranged in the storage management computer 4000, so that a similar effect to that in the first embodiment can be acquired also in the storage system including the storage device 2000 that does not have the logical partitioning function.

The present invention is not limited to the embodiments described above, and various modifications are included. For example, the configuration of each of the embodiments described above has been described in detail in order to explain the present invention in an easy-to-understand manner, and the present invention is not necessarily limited to those having all the configurations described in the embodiments. With respect to part of the configuration of each embodiment, other configurations can be added, deleted, or replaced.

Each component, function, processing unit, processing means, and the like described above may be realized by hardware, for example, by designing a part or all of them in an integrated circuit, or the like. The present invention can be realized by program code of software that realizes the functions of the embodiments. In this case, a storage medium recording the program code is provided to the computer, and the processor included in the computer reads out the program code stored in the storage medium. In this case, the program code itself read from the storage medium realizes the functions of the above-described embodiments, and the program code itself and the storage medium storing the program code constitute the present invention. Examples of the storage medium for supplying such program code include a flexible disk, a CD-ROM, a DVD-ROM, a hard disk, a solid state drive (SSD), an optical disk, a magneto-optical disk, a CD-R, a magnetic tape, a nonvolatile memory card, a ROM, or the like.

The program code for realizing the functions described in the embodiments can be implemented in a wide range of programs or script languages such as assembler, C/C++, perl, Shell, PHP, or Java (registered trademark).

The program code of the software realizing the functions of the embodiments may be distributed via a network, so that the code is stored in a storage means such as a hard disk or a memory of a computer or a storage medium such as a CD-RW or a CD-R, and the processor of the computer reads and executes the program code stored in the storage means or the storage medium.

In the embodiments described above, control lines and information lines indicate what is considered to be necessary for explanation, and all control lines and information lines are not necessarily shown in the product. All the structures may be mutually connected.

What is claimed is:

1. A computer system having a plurality of resources used for a source program, the computer system comprising:
    a memory; and
    an input/output device; and
    a processor communicatively coupled to the memory and the input/output device, wherein the processor is configured to
        store, via the memory, resource management information, which is information in which each of the resources is associated with a resource group; and
        store, via the memory, resource group management information which is information in which a user capable of using the resource group is associated with the source program and a role is further associated with the resource group, and,
        when receiving a request designating the resource related to a user who uses the source program from the source program, the processor executes, by using the resource group management information and the resource management information, a process of determining whether access to the resource related to the request is permitted in a case where both a role added to the request and a role in the resource group coincide with a comparison target.

2. The computer system according to claim 1, wherein the processor is further configured to:
    specify the resource group from the resource designated by the request and the resource management information, and
    determine whether the access is permitted on the basis of the specified resource group, the user related to the request, the source program related to the request, and the resource group management information.

3. The computer system according to claim 1, further comprising
    source program management information, stored in the memory, in which a possible role of the source program is defined, wherein
    the processor uses a role of the source program in the source program management information and a role in the resource group to determine whether the access is permitted.

4. The computer system according to claim 3, wherein
    the role used in determination as to whether the access is permitted is a role used by the user for login authentication to the source program and added to the request.

5. The computer system according to claim 3, wherein,
    in the information stored in the resource group management information, the user, an individual user, and the possible role of the individual user are associated with each other, and
    the processor uses the role of the individual user to determine whether the access is permitted.

6. The computer system according to claim 1, further comprising
    account management information, stored in the memory, in which the user and the possible role of the user are associated with each other, wherein
    the processor uses the role of the user in the account management information and the role in the resource group to determine whether the access is permitted.

7. The computer system according to claim 1, further comprising:
    account management information, stored in the memory, in which the user is associated with the possible role of the user; and
    source program management information in which a possible role of the source program is defined, wherein
    the processor
        uses the role of the user in the account management information and the role in the resource group to determine whether the access is permitted, in a case where the request is for the purpose of controlling a storage configuration, and
        uses the role of the source program in the source program management information and the role in the resource group to determine whether the access is permitted, in a case where the request is for the purpose of other than controlling the storage configuration.

8. The computer system according to claim 1, wherein
    when the resource group is created according to a request from a user via the source program, the processor adds information in which the user and the source program are associated with each other to the resource group management information.

9. A resource access control method of a computer system having a plurality of resources used for a source program, the method comprising:
    storing, via a memory, resource management information in which each of the resources is associated with a resource group; and
    storing, via the memory, resource group management information in which a user capable of using the resource group is associated with the source program and a role is further associated with the resource group, and
    when receiving a request designating the resource related to a user who uses the source program from the source program, executes, via a processor by using the resource group management information and the resource management information, a process of determining whether access to the resource related to the request is permitted in a case where both a role added to the request and a role in the resource group coincide with a comparison target.

* * * * *